(12) United States Patent
Karafin et al.

(10) Patent No.: US 11,474,370 B2
(45) Date of Patent: Oct. 18, 2022

(54) HOLOGRAPHIC OBJECT RELAY FOR LIGHT FIELD DISPLAY

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 17/280,777

(22) PCT Filed: Sep. 30, 2019

(86) PCT No.: PCT/US2019/053918
§ 371 (c)(1),
(2) Date: Mar. 26, 2021

(87) PCT Pub. No.: WO2020/069536
PCT Pub. Date: Apr. 2, 2020

(65) Prior Publication Data
US 2022/0043277 A1    Feb. 10, 2022

Related U.S. Application Data

(60) Provisional application No. 62/739,000, filed on Sep. 28, 2018.

(51) Int. Cl.
*G03H 1/26*    (2006.01)
*G02B 30/10*   (2020.01)
(52) U.S. Cl.
CPC ............ *G02B 30/10* (2020.01); *G03H 1/268* (2013.01); *G03H 2223/24* (2013.01)

(58) Field of Classification Search
CPC .......... G02B 5/10; G02B 5/20; G02B 5/3083; G02B 30/10; G02B 27/0103; G02B 27/01; G02B 27/283; G02B 27/286; G02B 27/017; G02B 2027/0109; G02B 2027/0107; G02B 2027/0174; G02B 2027/0134;
(Continued)

(56) References Cited

U.S. PATENT DOCUMENTS 5,166,813 A    11/1992  Metz
5,686,960 A    11/1997  Sussman et al.
(Continued)

FOREIGN PATENT DOCUMENTS

CN    108428716 A    8/2018
EP    1256822 A2    11/2002
(Continued)

OTHER PUBLICATIONS

International Search Report and Written Opinion of PCT/US2019/053918 dated Jan. 2, 2020.
(Continued)

*Primary Examiner* — Stephone B Allen
*Assistant Examiner* — Jyotsna V Dabbi
(74) *Attorney, Agent, or Firm* — Charles C. Yang

(57) ABSTRACT

Relay systems and methods are operable to redirect light corresponding to a light field or holographic object such that imagery generated by a light field or other display is perceived by a viewer without having to address the display itself.

6 Claims, 17 Drawing Sheets

(58) Field of Classification Search
CPC .. H04N 13/302; H04N 13/293; H04N 13/117; H04N 13/122; G03H 1/268; G03H 1/2202; G03H 1/26; G03H 2223/24; G03H 2222/52; G03H 222/54; G03H 2001/0088
USPC .......................................................... 359/22
See application file for complete search history.

(56) References Cited

U.S. PATENT DOCUMENTS

| | | |
|---|---|---|
| 5,822,125 A | 10/1998 | Meyers |
| 9,417,610 B1 | 8/2016 | Kim |
| 2003/0107712 A1 | 6/2003 | Perlin |
| 2009/0238217 A1 | 9/2009 | Moser et al. |
| 2010/0265808 A1 | 10/2010 | Yamakawa et al. |
| 2014/0104665 A1 | 4/2014 | Popovich et al. |
| 2016/0270656 A1 | 9/2016 | Samec et al. |
| 2016/0309065 A1 | 10/2016 | Karafin et al. |
| 2017/0102671 A1 | 4/2017 | Damm et al. |
| 2017/0123204 A1 | 5/2017 | Sung et al. |
| 2021/0356742 A1* | 11/2021 | Hong ................. G02B 27/0101 |

FOREIGN PATENT DOCUMENTS

| | | | |
|---|---|---|---|
| WO | 2018014046 A1 | 1/2018 | |
| WO | 2018014047 A1 | 1/2018 | |
| WO | WO-2018014046 A1 * | 1/2018 | ......... G02B 17/0864 |
| WO | WO-2018154564 A1 * | 8/2018 | ............ A61B 3/113 |
| WO | 2018165117 A1 | 9/2018 | |
| WO | 2019140348 A2 | 7/2019 | |

OTHER PUBLICATIONS

EP-19864513.7 European Extended Search Report of European Patent Office dated Jun. 3, 2022.

* cited by examiner

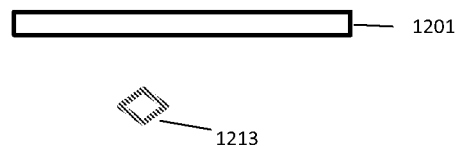
Figure 8D
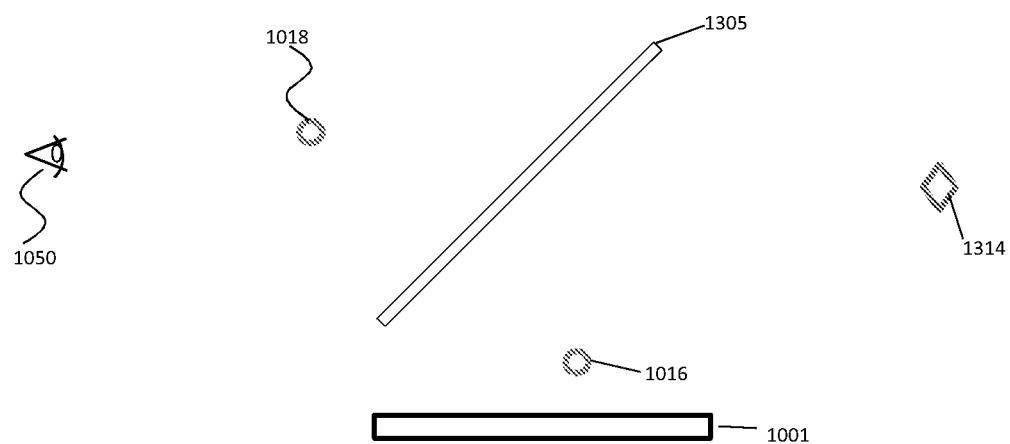
Figure 8E
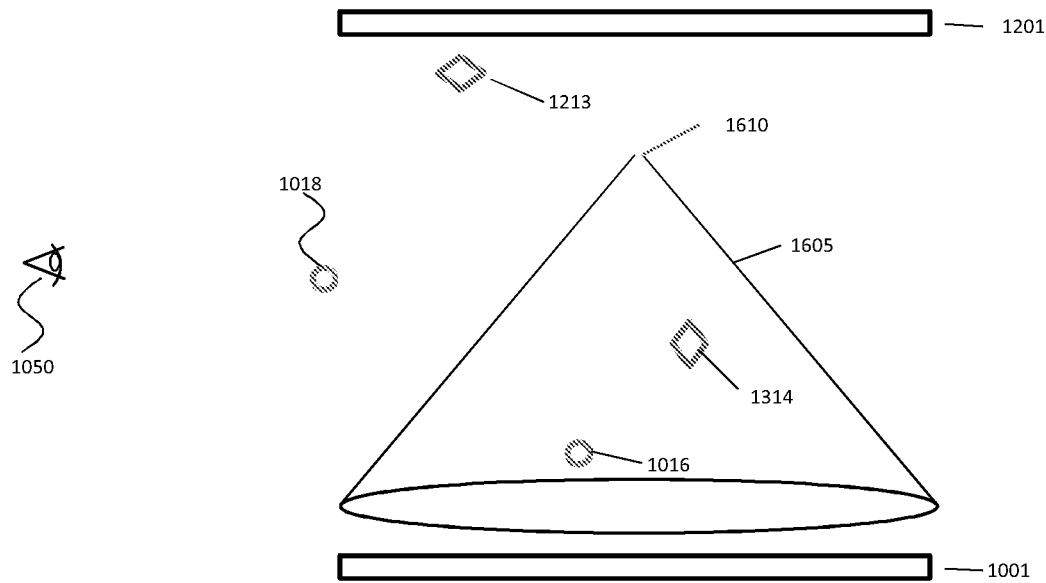

HOLOGRAPHIC OBJECT RELAY FOR LIGHT FIELD DISPLAY

CROSS-REFERENCE TO RELATED APPLICATIONS

This Application is a National Stage Application of International Application No. PCT/US2019/053918, which claims the benefit of priority to U.S. Provisional Patent Application No. 62/739,000, entitled "HOLOGRAPHIC OBJECT RELAY FOR LIGHT FIELD DISPLAY," filed Sep. 28, 2018, which are both herein incorporated by reference in their entirety.

TECHNICAL FIELD

This disclosure generally relates to systems configured for generating light corresponding to 2D, 3D, or holographic imagery and further configured to relay the generated holographic imagery to desired locations.

BACKGROUND

Many technologies exist today that are often unfortunately confused with holograms including lenticular printing, Pepper's Ghost, glasses-free stereoscopic displays, horizontal parallax displays, head-mounted VR and AR displays (HMD), and other such illusions generalized as "fauxlography." These technologies may exhibit some of the desired properties of a true holographic display, however, lack the ability to stimulate the human visual sensory response in any sufficient way.

Light field and holographic display is the result of a plurality of projections where energy surface locations provide angular, color and intensity information propagated within a viewing volume. Unlike a stereoscopic display, the viewed position of the converged energy propagation paths in space do not vary as the viewer moves around the viewing volume and any number of viewers may simultaneously see propagated objects in real-world space as if it was truly there.

SUMMARY

An embodiment of a holographic display system includes a first display, comprising a light field display configured to project light along a set of projected light paths to form at least a first holographic surface having a first projected depth profile relative to a display screen plane; and a relay system positioned to receive light along the set of projected light paths from the light field display and relay the received light along a set of relayed light paths such that points on the first holographic surface are relayed to relayed locations thereby forming a first relayed holographic surface having a first relayed depth profile relative to a virtual screen plane, the first relayed depth profile being different from the first projected depth profile. The light field display comprises a controller configured to receive instructions for accounting for the difference between the first projected depth profile and the first relayed depth profile by operating the light field display to output projected light such that the first relayed depth profile of the first relayed holographic object is the depth profile intended for a viewer.

An embodiment of a holographic display system includes a first display, comprising a light field display configured to project light along a set of projected light paths to form at least a first holographic surface, the set of projected light paths determined according to a first four-dimensional (4D) function defined by the light field display, such that each projected light path has a set of positional coordinates and angular coordinates in a first 4D coordinate system defined with respect to a display screen plane. The system also includes a relay system positioned to receive light along the set of projected light paths from the light field display and relay the received light along a set of relayed light paths such that points on the first holographic surface are relayed to relayed locations thereby forming a first relayed holographic surface, the set of relayed light paths having been determined according to a second 4D function defined by the relay system, such that each relayed light path has a set of positional coordinates and angular coordinates in a second 4D coordinate system defined with respect to a virtual screen plane. The light field display comprises a controller configured to receive instructions for accounting for the second 4D function by operating the light field display to output projected light according to the first 4D function such that the positional coordinates and angular coordinates in the second 4D coordinate system for each of the set of relayed light paths allow the relayed holographic surface to be presented to a viewer as intended.

An embodiment of a holographic display system includes a light field display configured to project light along a set of projected light paths to form at least first and second holographic surfaces in a first depth order relative to a display screen plane; a relay system positioned to receive light along the set of projected light paths from the light field display and relay the received light along a set of relayed light paths such that points on the first and second holographic surfaces are relayed to relayed locations thereby forming first and second relayed holographic surfaces perceivable in a second depth order relative to a virtual screen plane, the first and second depth orders are reversed; and a corrective optical element disposed in the set of relayed light paths, wherein each of the set of relayed light paths has a set of positional coordinates and angular coordinates in a four-dimensional (4D) coordinate system, and wherein the corrective optical element is configured to reverse the polarity of the angular coordinates of each of the first set of relayed light paths such that the first and second relayed holographic surfaces are perceivable with a corrected depth order that is substantially the same as the first depth order.

An embodiment of a holographic display system includes a light field display configured to project light along a set of projected light paths to form at least first and second holographic surfaces in a first depth order relative to a display screen plane; a corrective optical element disposed in the set of projected light paths, wherein each of the first set of projected light paths has a set of positional coordinates and angular coordinates in a four-dimensional (4D) coordinate system, and wherein the corrective optical element is configured to reverse the polarity of the angular coordinates of each of the set of projected light paths, the first and second holographic surfaces have an intermediate depth order that is reversed from the first depth order; and a relay system positioned to receive light along the set of projected light paths from the corrective optical element and relay the received light along a set of relayed light paths such that points on the first and second holographic objects are relayed to relayed locations thereby forming first and second relayed holographic surfaces perceivable in a second depth order relative to a virtual screen plane, the first and second depth orders are the same.

An embodiment of a holographic display system includes a first display, comprising a light field display configured to project light along a first set of projected light paths to form at least first and second holographic surfaces having first and second depth profiles, respectively relative to a display screen plane; and a first relay system positioned to receive light along the first set of projected light paths from the light field display and relay the received light along a first set of relayed light paths such that points on the first and second holographic surfaces are relayed to relayed locations thereby forming first and second relayed holographic surfaces having first and second relayed depth profiles, respectively, relative to a virtual screen plane.

An embodiment of a holographic display system includes a first display, comprising a light field display configured to project light along a first set of projected light paths to form at least a first holographic surfaces having a first depth profile relative to a display screen plane; a first relay system positioned to receive light along the first set of projected light paths from the light field display and relay the received light along a first set of relayed light paths such that points on the first holographic surface are relayed to relayed locations thereby forming a first relayed holographic surface having a first relayed depth profile relative to a virtual screen plane; and a second relay system positioned to receive light from the first relay system along the first set of relayed light paths and relay the received light along a second set of relayed light paths such that points on the first relayed holographic surface are further relayed to new relayed locations, thereby forming a second relayed holographic surface having a second relayed depth profiles, respectively, relative to a new virtual screen plane.

BRIEF DESCRIPTION OF THE DRAWINGS

FIG. 8D illustrates an embodiment showing an abstraction of the display system shown in FIGS. 8A and 8B;

FIG. 8E illustrates an embodiment of system of FIG. 8D with a transmissive reflector having a conical surface.

DETAILED DESCRIPTION OF THE DRAWINGS

Figure 1A:
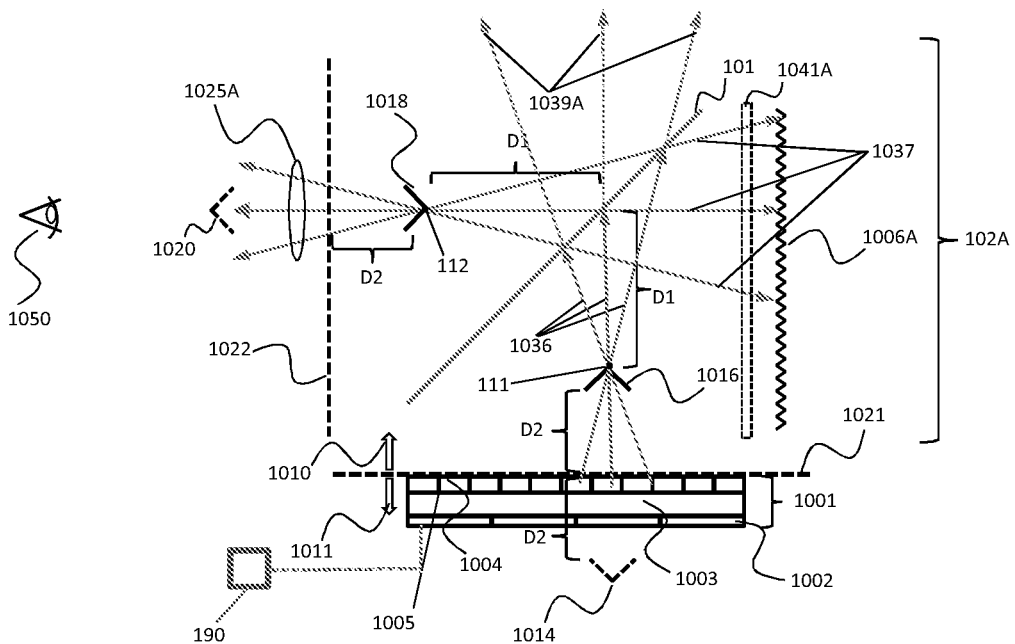
FIG. 1A illustrates an embodiment of a system configured to relay a holographic surface projected by a light field display using a beam splitter and an image retroreflector.

FIG. 1A shows an embodiment of a holographic display system including a first display 1001 comprising a light field display configured to project light along a set of projected light paths 1036 to form at least a first holographic surface 1016 having a first projected depth profile relative to a display screen plane 1021. In an embodiment, the first holographic surface 1016 may be any surface in a holographic scene, such as a portion of an object, a face, a background scene, etc. In an embodiment, the projected depth profile of the holographic surface 1016 may include a depth perceivable by a viewer (not shown) observing the first display 1001 along a normal axis (not shown) of the display 1001. The holographic display system of FIG. 1A also includes a relay system 102A positioned to receive light along the first set of projected light paths 1036 from the light field display 1001 and relay the received light along a set of relayed light paths 1025A such that points on the first holographic surface 1016 are relayed to relayed locations thereby forming a first relayed holographic surface 1018 having a first relayed depth profile relative to a virtual screen plane 1022. In an embodiment, the virtual screen plane 1022 is oriented at a non-parallel angle relative to the display screen plane 1021 of the light field display 1001. In an embodiment, the virtual screen plane 1022 is oriented at a perpendicular angle relative to the display screen plane 1021 of the light field display 1001.

In an embodiment, the depth profile of the holographic surface 1016 may include a depth perceivable by a viewer 1050 observing in the direction of the virtual screen plane 1022. As illustrated in FIG. 1, the first relayed depth profile of the relayed holographic surface 1018 is different from the first projected depth profile of the first holographic surface 1016: first holographic surface 1016 is projected as an off-screen holographic surface while the first relayed holographic surface 1018 is perceivable by viewer 105 as an in-screen holographic surface relative to the virtual screen plane 1022.

In an embodiment, the relay system 102A may relay holographic objects projected by a light field display 1001 using a beam splitter 101 and an image retroreflector 1006A. In an embodiment, the light field display 1001 comprises one or more display devices 1002, having a plurality of light source locations (not shown), an imaging relay 1003 which may or may not be present which acts to relay images from the display devices to an energy surface 1005, and an array of waveguides 1004 which project each light source location on the energy surface 1005 into a unique direction (u,v) in three dimensional space. The energy surface 1005 may be a seamless energy surface that has a combined resolution that is greater than the surface of any individual display device 1002. Examples of light field display 1001 are described in commonly-owned U.S. Pat. App. Pub. Nos. US2019/0064435, US2018/0356591, 2018/0372926, and U.S. patent application Ser. No. 16/063,675, all of which are incorporated herein by reference for all purpose. Projected light rays 1036 may converge at a location 111 on the surface of a holographic object 1016, and then diverge as they approach the beam splitter 101. The beam splitter 101 may be configured to include a polarizing beam splitter, a transparent, aluminum-coated layer, or at least one dichroic filter. In an embodiment, the beam splitter 101 may be oriented at a 45 degree angle relative to the display screen plane 1021 and the retroreflector 1006A, and the retroreflector 1006 is oriented orthogonally relative to the display screen plane 1021. Some fraction of the incident light along the projected light path 1036 reflects from the beam splitter 101 toward the image retroreflector 1006A along a set of reflected light paths 1037, while much of the remaining light passes through the beam splitter 101 into rays along a set of transmitted light paths 1039A, which may not contribute to the formation of the relayed holographic object 1018 in FIG. 1A. In an embodiment, the retroreflector 1006A may contain a fine array of individual reflectors, such as corner reflectors. The retroreflector 1006A acts to reverse each ray of incident light in the opposite direction from the approach direction, with no significant spatial offset. Rays along light paths 1037 reverse their direction upon reflecting from the retroreflector 1006A, substantially retracing their approach angle to the retroreflector 1006A, and some fraction of their intensities pass through the beam splitter 101 along the set of relayed light paths 1025A, converging at the location 112 of the holographic object 1018. In this way, holographic object 1016 projected directly by the light field display 1001 is relayed to form the relayed holographic object 1018.

FIG. 1A may have an optional optical element 1041A located between the beam splitter 101 and the retroreflector 1006A. The relative placement of this optional optical element 1041A is similar to the optional optical element 1041A that appears in FIG. 1B. This optical element may be a polarization controlling element used together with a polarization beam splitter 101. If the display 1001 produces only one polarization state, then a polarizing beam splitter 101 may be arranged to direct almost all the light of the display toward the retroreflector 1006A, eliminating most of the light rays 1039A which may pass vertically through the beam splitter and not contribute to imaging the holographic object 1018. Using a polarizing beam splitter 101, the light rays 1037 are linearly polarized as they approach the optical element 1041A, and are circularly polarized after passing through the optical element 1041A, which may include a quarter wave retarder. Upon reflection from the retroreflector 1006A, most of the light on rays 1025A may be circularly polarized in the opposite direction, and for this opposite circular polarization, the return pass through the quarter wave retarder will result in these light rays converted to a linear polarization that is rotated 90 degrees relative to the light leaving the beam splitter 101 on rays along the reflected light paths 1037. This light has the opposite polarization to the light that was reflected by the beam splitter 101, so it will pass straight through the beam splitter 101 rather than being deflected, and contribute to the imaging of holographic object 1018. In short, a quarter wave plate optical element 1041A placed between the beam splitter 101 and the retroreflector 1006A may assist in converting the majority of light reflected from the beam splitter 101 from one linear polarization to the opposite linear polarization, so that this light is passed by the beam splitter 101 with optimal efficiency in generating a holographic image, and limited wasted light.

Figure 1B:
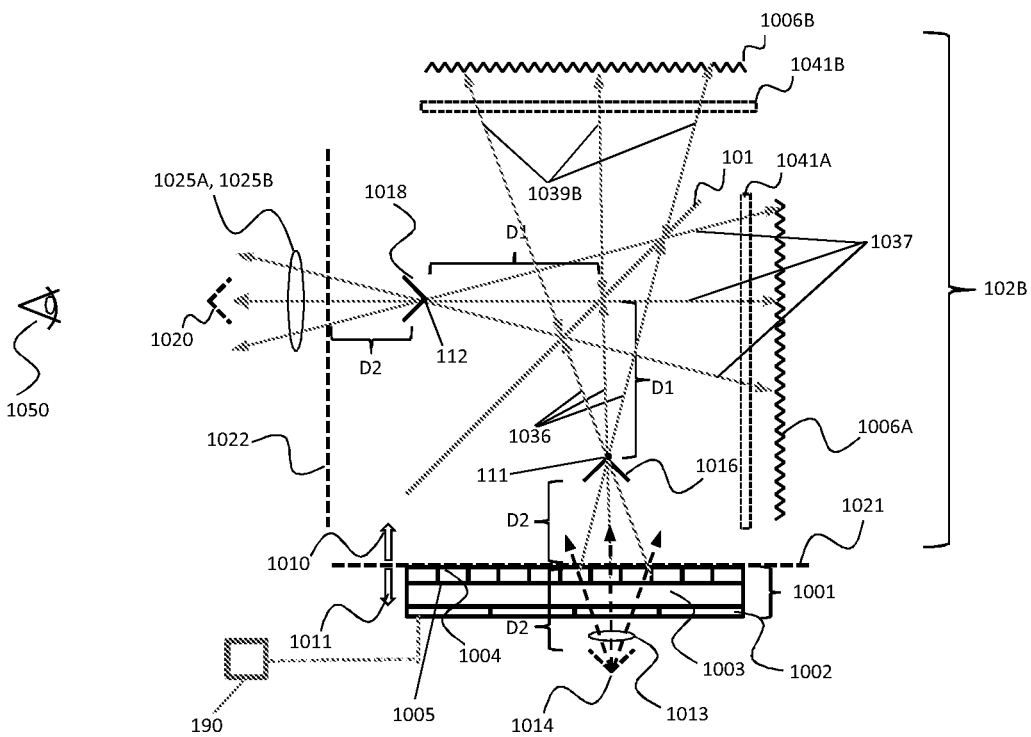
FIG. 1B illustrates an embodiment of a system configured to relay a holographic surface projected by a light field display using a beam splitter and a plurality of image retroreflectors.

In cases where the display 1001 produces unpolarized light, about half of the incident light 1036 on the beam splitter will be directed to light rays along the set of reflected light paths 1037 toward the retroreflector 1006A, and about half of the incident light will be directed along a set of transmitted light paths 1039A, in the vertical direction. This results in a loss of light rays 1039A. In an embodiment, as shown in FIG. 1B, the holographic display system of FIG. 1A may include a relay system 102B that includes an additional retroreflector 1006B. In an embodiment, the additional retroreflector 1006B may be disposed opposite to the display 1001 from the beam splitter 101, symmetric in distance but orthogonal in orientation to retroreflector 1006A. FIG. 1B shows a system which relays holographic surfaces projected by a light field display 1001 using a holographic relay system 102B comprised of a beam splitter 101 and two image retroreflectors 1006A and 1006B, where each retroreflector reflects rays of incident light in the direction reverse of their incident direction. In contrast to FIG. 1A, in which the light rays along the transmitted paths 1039A are lost, the light rays along the transmitted paths 1039B are retroreflected from retroreflector 1006B in the same way as rays along the reflected paths 1037 are retroreflected from retroreflector 1006A. Light rays along transmitted paths 1039B and reflected paths 1037 are retroreflected and converge at the beam splitter 101, and combine to form light rays along the set of relayed paths 1025B, which focus at point 112, contributing to the first relayed holographic surface 1018. In an embodiment, the additional retroreflector 1006B and the beam splitter 101 are aligned such that projected light that was transmitted through the beam splitter 101 towards the additional retroreflector is reflected from the additional retroreflector 1006B and further reflected by the beam splitter 101 along an additional set of relayed light paths 1025B towards the virtual display screen 1022, and the set of the relayed light rays 1025A from first retroreflector 1006A and the additional set of relayed light rays 1025B from the additional retroreflector 1006B substantially overlap. As discussed in regard to the optional optical element 1041A shown in FIG. 1A, the optical element 1041B may include a quarter wave retarder which may result in a majority of light rays along the transmitted paths 1039B returning to the beam splitter 101 with the opposite linear polarization, such that the majority of these light rays will be directed by the beam splitter 101 toward the formation of the holographic surface 1018, rather than straight through the beam splitter 101 and towards the display 1001. The optional optical element 1041B may contain polarization controlling elements, diffractive elements, refractive elements, focusing or defocusing elements, or any other optical elements.

Referring now to FIGS. 1A and 1B, in an embodiment, the vertical distance D1 between points such as location 111 on the directly projected surface 1016 may be the same as the horizontal distance D1 between points such as location 112, which corresponds to location 111, on the relayed holographic surface 1018. The relay system 102A or 102B may be configured to relay a plurality of holographic surfaces distributed around display screen plane 1021, including the out-of-screen surface 1016 on the side 1010 of the screen plane 1021, and surfaces that are projected in-screen on the side 1011 of the screen plane 1021. In the example shown in FIGS. 1A and 1B, the surface 1016 is projected as an off-screen holographic surface. These holographic surfaces may be relayed from screen plane 1021 to virtual plane 1022 so that surfaces 1016 which are out-of-screen for the screen plane 1021 appear behind the virtual plane 1022 with respect to a viewer 1050, and similarly, so that surfaces that are in-screen for the light field display 1001, projected on the side 1011 of screen plane 1021, appear in front of the virtual screen plane 1022 with respect to a viewer 1050. For this reason, the depth of holographic surface 1016 flips polarity—the location 111 of the out-of-screen holographic surface 1016 that is furthest away from the display screen plane 1021 is relayed to location 112 of the relayed holographic surface 1018 that is furthest from the viewer 1050. To account for this reversal of depth, and to present the observer 1050 with the same view and same depth profile of the relayed holographic surface 1016 that an observer of directly projected out-of-screen holographic object 1016 would see without the use of relay system 102B, one approach is to reverse the polarity of the U-V light field coordinates, which are the two angular coordinates in the 4D light field function with coordinates (X, Y, U, V, converting projected light rays 1036 into projected light rays 1013, each of which have the opposite slope. This converts out-of-screen holographic projected surface 1016 into in-screen holographic projected surface 1014 with a reversed depth, which will be relayed into relayed holographic surface 1020. Relayed holographic surface 1020 is out-of-screen relative to the virtual display plane 1022, and will appear to observer 1050 to have the same depth profile relative to the virtual screen plane 1022 as projected object 1016 has relative to the display screen plane 1021. Projected holographic surface 1014 will appear to be depth-reversed relative to the display screen plane 1021. In summary, to project a holographic surface 1020 for observer 1050 of the virtual screen plane 1022, the intended projected holographic surface 1016 with the intended depth profile may be rendered for the display screen 1021, and then each of the U-V angular light field coordinates may be flipped to produce a depth-reversed surface 1014 which appears on the opposite side of the display screen plane 1021 from holographic object 1016, but which is relayed by relay system 102A or 102B into relayed holographic object 1020 with the intended relayed holographic surface and the intended depth profile relative to the virtual screen plane 1022. The 4D light field coordinate system for (X,Y,U,V) is described in in commonly-owned U.S. Pat. App. Pub. Nos. US2019/0064435, US2018/0356591, US2018/0372926, and U.S. patent application Ser. No. 16/063,675, which are incorporated herein by reference and will not be repeated here.

In an embodiment, each of the set of projected light paths 1036 has a set of positional coordinates and angular coordinates in a four-dimensional (4D) coordinate system defined with respect to the display screen plane, and each of the set of relayed light paths 1025A, 1025B has a set of positional coordinates and angular coordinates in a four-dimensional (4D) coordinate system defined with respect to the virtual display plane. As described above, holographic surface 1014 may be rendered so that the light forming the surface of object 1014 will be relayed as the intended distribution for the relayed surface 1020 which may be directly viewed by observer 1050. One way to render holographic surface 1014 is to first render holographic object 1016, the intended object to be shown in absence of relay systems 102A or 102B, and then reversed in polarity its U-V angular coordinates. This reversal of U-V coordinates may result in holographic object 1014 being projected instead of object 1016, which may be relayed to the intended location of the holographic object 1020. The U-V polarity reversal may be done with a corrective optic element, as summarized below in reference to FIG. 2A, or using an adjustment in the 4D light field coordinates, as summarized below in reference to FIGS. 2B and 2C.

Figure 2A:
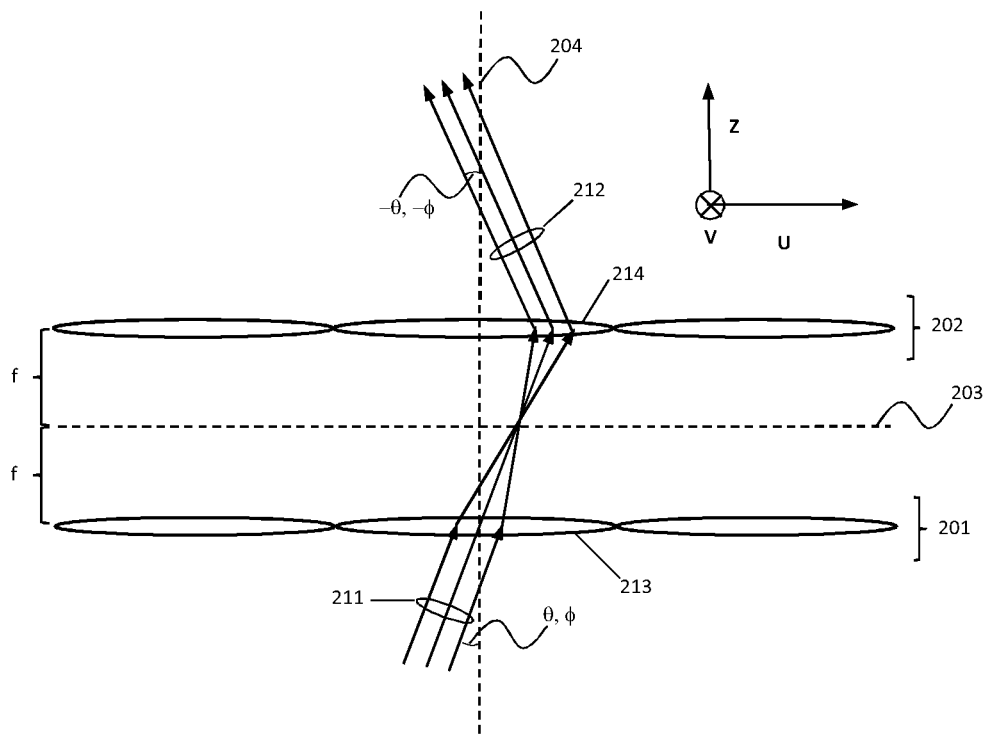
FIG. 2A illustrates an embodiment of a corrective optical element configured to reverse the polarity of U-V angular coordinates in a four-dimensional (4D) coordinate system.

FIG. 2A shows an embodiment of a corrective optical element which acts to reverse the polarity of U-V angular light field coordinates. Two substantially identical rows of lenses 201, 202 are placed side-by-side. The rows of lenses 201 and 202 has a focal length f, and are oriented parallel to one another, with a spacing of twice the focal length f, so that their focal planes overlap at virtual plane 203, and so that lenses on opposite sides of virtual plane 203, such as 213 and 214, share a common optical axis 204. Incoming parallel light rays 211 are incident on lens 213 with an incident angle to the optical axis 204 of θ in the U-Z plane, and ϕ in the V-Z plane. The light rays 211 are focused by lens 213 onto the focal plane 203, and then diverge toward lens 214, which refracts the rays into parallel rays 212. Parallel rays 212 leave 20 with the reversed polarity angles of −θ with respect to the optical axis 204 in the U-Z plane, and −ϕ with respect to the optical axis 204 in the V-Z plane, resulting in a direction that has been reversed relative to the incident direction of parallel rays 211. This relay system may be placed above the screen plane 1021 in the projected light paths 1036 or in the relayed light paths 1025A, 1025B in FIGS. 1A and 1B in order to reverse the polarity of U-V coordinates for projected holographic surfaces or relayed holographic surfaces, respectively.

Figure 2B:
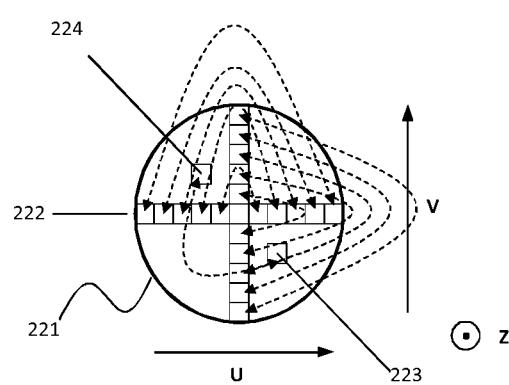
FIG. 2B illustrates a top-level view of a waveguide placed over a number of illumination source pixels in the U-V plane.

In an embodiment, the light field display 1001 may include a controller 190, as shown in FIGS. 1A and 1B, configured to receive instructions for accounting for the difference between the first projected depth profile and the first relayed depth profile by operating the light field display 1001 to output projected light such that the first relayed depth profile of the first relayed holographic object is the depth profile intended for a viewer 1050. FIG. 2B shows a top-level view of a waveguide 221 of the light field display 1001 placed over a number of illumination source pixels 222 in the U-V plane, including a row of pixels at V=0, a column of pixels at U=0, and individual pixels 223 and 224. In an embodiment, the waveguide 221 allows light from the pixels 222 to be projected along the set of projected light paths 1036 where each projected light path 1036 has set of positional coordinates (X, Y) and angular coordinates (U,V) in a four-dimensional (4D) coordinate system. In order to reverse the polarity of the U-V coordinates, and create holographic object 1014 from a light field rendered for holographic object 1016 in FIGS. 1A and 1B, one would exchange the polarity of the U and V coordinates as shown in the diagram, so that a pixel 224 with −U and +V coordinates would swap places with a pixel 223 with +U and −V coordinates. All other pixels would swap positions as indicated, with the exception of U,V=0,0, which stays in place.

Figure 2C:
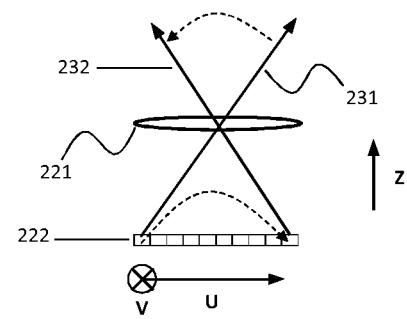
FIG. 2C illustrates a side view of the embodiment shown in FIG. 2B in the U-Z plane with a thin lens as the waveguide.

FIG. 2C shows a side view of the embodiment shown in FIG. 2B in the U-Z plane with a thin lens as the waveguide 221. The two pixels located at the minimum and maximum U coordinates for a row of pixels 222 at V=0 are swapped. The result is that the intensity and color of projected rays from the pixels at the minimum U, 231, and the maximum U, 232, swap places.

Figure 3A:
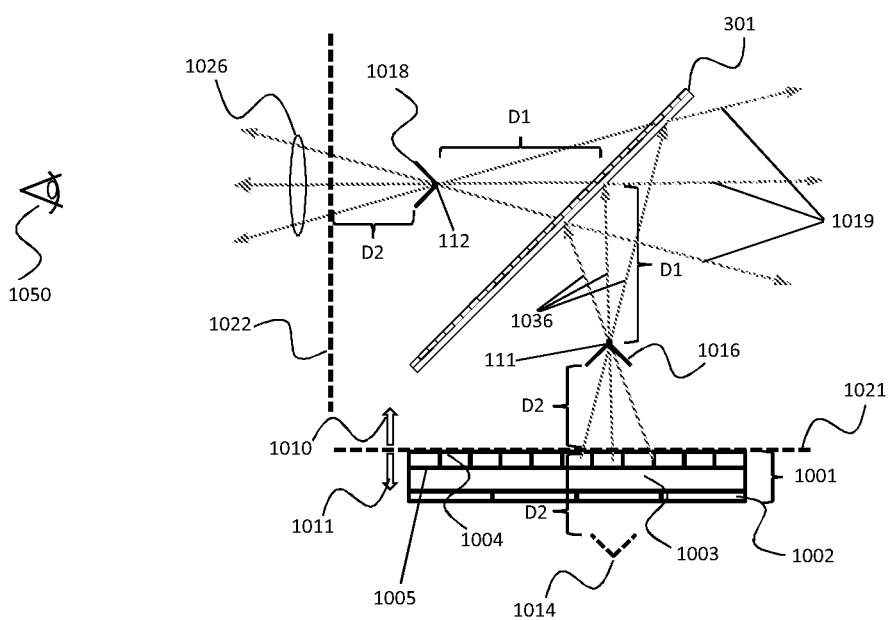
FIG. 3A illustrates an embodiment of a holographic display system similar to the system shown in FIG. 1A, in which the beam splitter and image retroreflector have been replaced by a transmissive reflector.
Figure 4A:
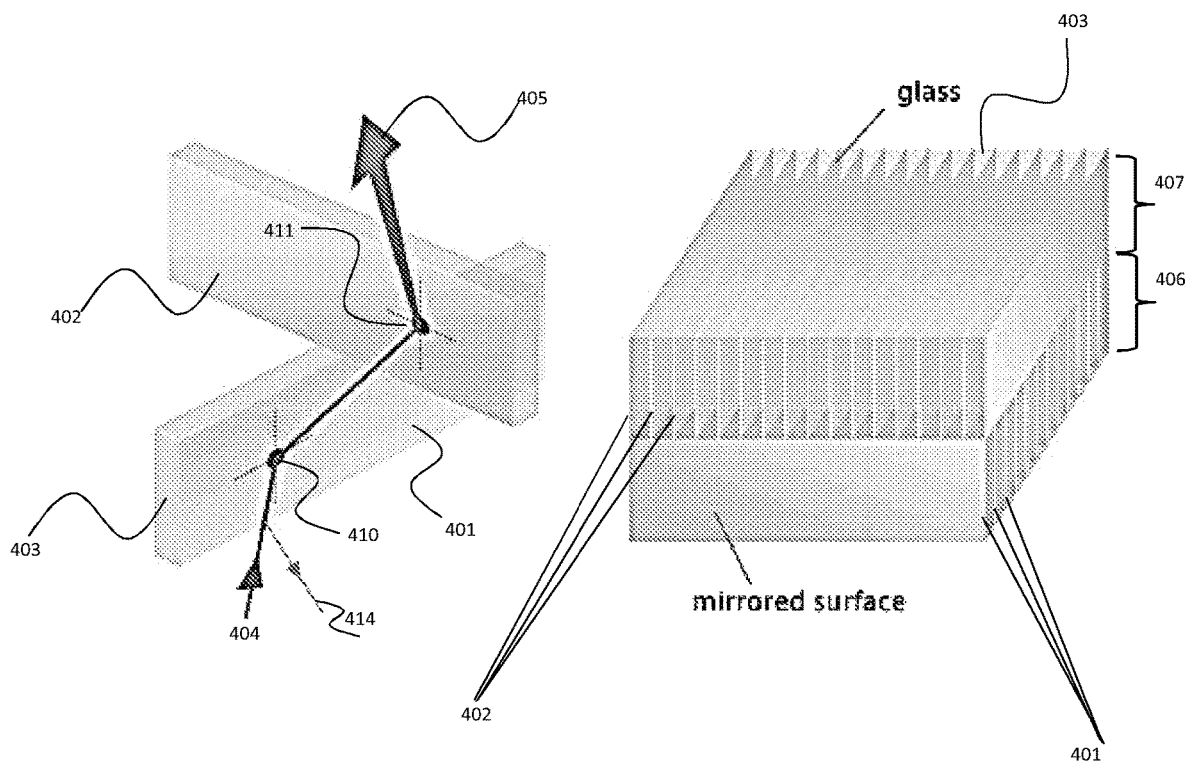
FIG. 4A illustrates a combined view of an embodiment of a dihedral corner reflector array (DCRA)

FIG. 3A shows an embodiment of a holographic system which is similar to the configuration shown in FIG. 1A, except that the relay system 102A shown in FIG. 1A comprised of the beam splitter 101 and image retroreflector 1006A has been replaced by a relay system which is comprised of a single transmissive reflector 301 positioned to receive light along the set of projected light paths 1036 and direct the received light along the set of relayed light paths 1026. In an embodiment, the transmissive reflector 301 internally reflects a portion of the received light among a plurality of internal reflective surfaces (shown as 401, 402 in FIG. 4A, described below) of the transmissive reflector 301 and output light along the set of relayed light paths 1026 towards the virtual screen plane 1022 in a first direction. An example of the transmissive reflector 301 may be a dihedral corner reflector array (DCRA), which is an optical imaging element composed of a plurality of dihedral corner reflectors, which may be realized as two thin layers of closely-spaced parallel mirror planes, oriented so the planes are orthogonal to one another as shown in FIG. 4A. Another example is a corner reflector micro mirror array. Projected light rays 1036 may converge at a location 111 on the surface of a holographic surface 1016, and then diverge as they approach the transmissive reflector 301. The transmissive reflector 301 internally reflects the diverging rays 1036 such that they exit the other side of 301 as rays along the relayed paths 1026 and converge at location 112 of relayed holographic surface 1018. This may be accomplished within the transmissive reflector 301 through a sequence of two reflections as shown in FIG. 4A. In this way, holographic surface 1016 projected directly by the light field display 101 is relayed to form relayed holographic surface 1018.

FIG. 4A shows an assembled view of an embodiment of the detailed structure of a DCRA 401, as well as the path of a light ray that passes through the DCRA 41. In an embodiment, the DCRA is constructed of two layers 406 and 407 of closely-spaced reflective planes that are parallel but offset in a first dimension and the direction of the reflective planes 401 in layer 406 are oriented orthogonally to the direction of the reflective planes 402 in layer 407 in as second dimension. Reflective surfaces 401 and 402 may be mirrored surfaces. An incident light ray 404 reflects some of its energy into reflected light ray 414 as it passes through the external surface (shown as 430 in FIG. 4B) of the transmissive reflector. Light ray 404 has one component of its momentum reversed upon the first reflective surface 401 at location 410, and then has a substantially orthogonal component of momentum reversed upon a second reflection at point 411 from the second reflective surface 402.

Figure 4B:
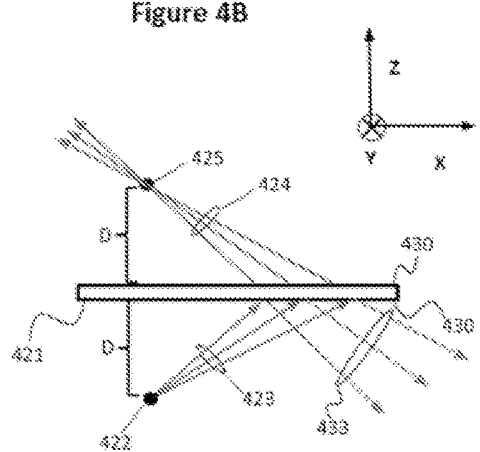
FIG. 4B illustrates a side view of an embodiment of transmissive reflector imaging a point source of light.

FIG. 4B shows a side view of an embodiment of transmissive reflector 421, which may be a DCRA, imaging a point source of light 422 located a distance D from transmissive reflector 421. The transmissive reflector 421 is aligned parallel to the X-Y plane. Each of the rays of light 423 from the point source 422 has its X and Y momentum components reversed by transmissive reflector 421, so that the light rays 424 that exit 421 converge at image point 425, a distance D from transmissive reflector 421. A portion of the light rays 423 reflect off of the external surfaces 430 of the transmissive reflector 421, creating reflected light rays 433.

Figure 3B:
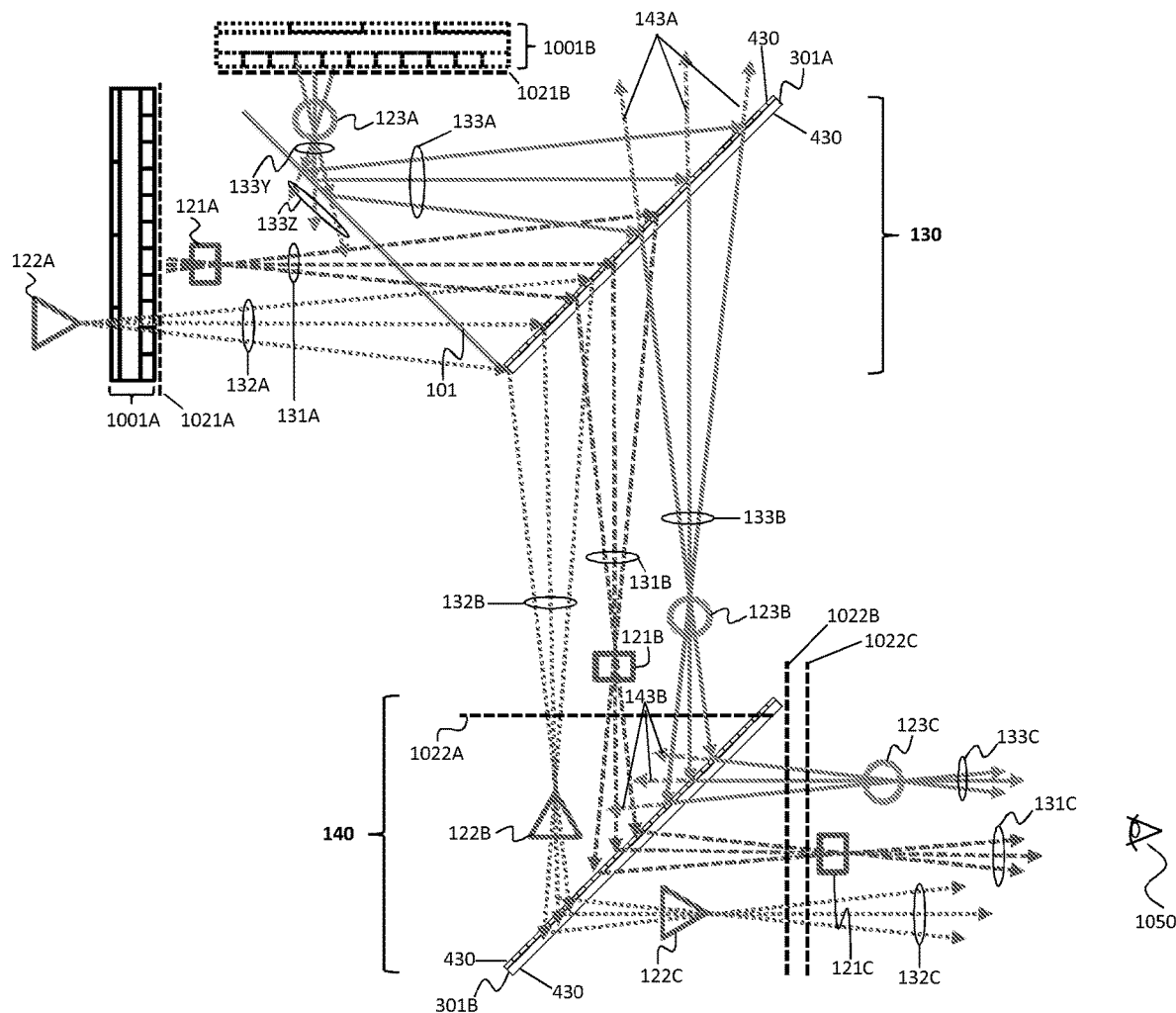
FIG. 3B illustrates an embodiment of a holographic display system having multiple relay systems.
Figure 3C:
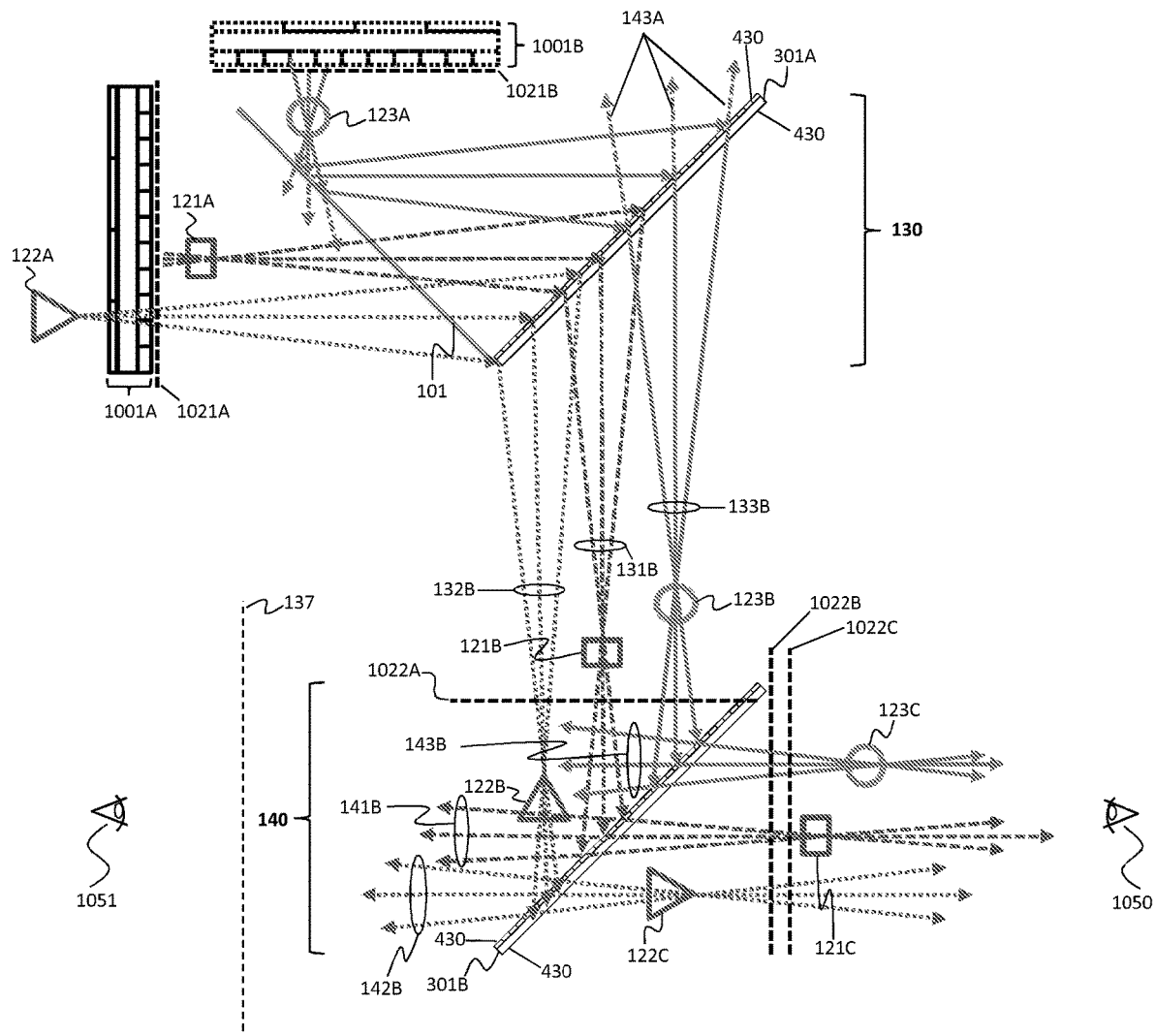
FIG. 3C illustrates another embodiment of a holographic display system having multiple relay systems.

Turning now to FIGS. 3B and 3C, it is possible to use a configuration with more than one relay to relay holographic surfaces. If a holographic surface is relayed twice, then the depth reversal of the holographic object that may occur with the first relay may be undone with the second relay. This is generally true for holographic surfaces that are relayed by an even number of holographic relays. FIG. 3B shows a light field display system comprised of at least a first light field display 1001A, and two relay systems 130 and 140 which together relay at least a first projected holographic surface to a final relay location. In the embodiment shown in FIG. 3B, holographic surfaces 121A and 122A are projected around the light field display screen plane 1021A and relayed to final relayed locations 121C and 122C around a virtual display plane 1022B, with no depth reversal. Also shown in FIG. 3B is an optional second light field display 1001B, which may project an image surface 123A. In place of the second light field display 1001B, the surface 123A may be the surface of a real-world object, the image of which will be combined with holographic surfaces 121A and 122A by the beam splitter 101 and relayed by the pair of relay systems 130 and 140 to image position 123C, with no depth reversal. The holographic surfaces and the image of the real-world object are combined and relayed together to a new relayed location, allowing the holographic surfaces and the real-world object to be displayed together free of a physical display plane.

In FIG. 3B, both relay systems 130 and 140 include transmissive reflectors 301A and 301B, respectively, but either one of these relays could also be comprised of a beam splitter and a retroreflector like relay 102A shown in FIG. 1A. The holographic surfaces 121A and 122A are formed with light along a set of projected light paths 131A and 132A from light field display 1001A, and some fraction of light along the set of projected light paths are transmitted straight through the beam splitter 101. The beam splitter may be any beam splitter disclosed in the present disclosure. Projected light along the set of projected light paths 131A and 132A are relayed by first relay system 130 along a first set of relayed light paths 131B and 132B which form depth-reversed first and second relayed holographic surfaces 121B and 122B around first virtual screen plane 1022A, respectively. Light along the first set of relayed light paths 131B and 132B are relayed by the second relay system 140 along a second set of relayed light paths 131C and 132C, which form third and fourth related holographic surfaces 121C and 122C, not depth-reversed, around a new virtual screen plane 1022B. Relayed holographic objects 121C and 122C should have the same depth profile relative to screen plane 1022B as the depth profile of source projected surfaces 121A and 122A, respectively.

Image surface 123A is either the surface of a real-world object, or a holographic surface projected by the optional second light field display 1001B with a depth profile with respect to the screen plane 1021B of the light field display 1001B. A portion of light along input paths 133Y from surface 123A are reflected by the beam splitter 101 into projected light paths 133A, while the other portion passes through the beam splitter 101 along a set of transmitted paths 133Z. The transmissive reflector 301A of relay system 130 has reflective surfaces 430, and some of the incident light along the projected paths 133A reflects into light paths 143A (and this is true for light along the projected paths 131A and 132A, but this is not shown in FIG. 3B). A portion of light along projected paths 133A from the object 123A are relayed by first relay system 130 to relayed light paths 133B of a first set of relayed light paths 131B, 132B, and 133B. The light paths 133B form depth-reversed image 123B. Some of the light along the relayed light paths 133B reflect from the surface of transmissive reflector 301B of relay system 140 along reflected paths 143B (this is also true for incident light along relayed light paths 131B and 132B, but these reflections from the surface of transmissive reflector 301B are not shown FIG. 3B). The other portion of light along the relayed light paths 133B are relayed a second time by second relay system 140 to relayed light paths 133C of a second set of relayed light paths 121C, 132C, and 133C. The relayed light paths 133C form relayed surface 123C, not depth-reversed, which is either an image of a real-world object 123A, or a relayed holographic surface 123A, wherein relayed surface 123C has the same depth profile to observer 1050 as the source projected holographic surface 123A has with respect to display screen plane 1021B. The virtual screen plane relayed from display screen plane 1021B is virtual screen plane 1022C. First observer 1050 will see either two relayed holographic surfaces 121C and 122C, and a holographic image 123C of real-world surface 123A, or three relayed holographic objects 121C, 122C, and 123C. In the configuration shown in FIG. 3B, by using the beam splitter 101 with the second light field display 1001B in place, the holographic content from two light field displays may be superimposed into the same space around second virtual screen 1022B, without depth reversal, allowing for an increase in the depth range for displaying holographic objects that exceeds the depth range of either of the individual light field displays 1001A or 1001B. Note that each display 1001A and 1001B may produce holographic objects in a holographic object volume in the neighborhood of corresponding display screen planes 1021A and 1021B, respectively. These holographic object volumes are relayed to virtual screen plane 1022B corresponding to display screen 1021A and virtual screen plane 1022C corresponding to display screen 1021B. The amount of separation between virtual screen planes 1022B and 1022C is dependent on the difference in a first distance between display 1001A from the transmissive reflector 301A, and a second distance between display 1001B and the transmissive reflector 301A. If these distances are the same, then the virtual screen planes 1022B and 1022C will overlap. Also note that since the proximity of either light field display 1001A or 1001B from the beam splitter 101 may be adjusted, the relayed holographic object volumes in the neighborhood of the virtual screen planes 1022B and 1022C may contain either one large or two smaller but separated regions for display of holographic objects that is tunable for a given application. In the event that the relayed holographic object volumes overlap, then a combined relayed holographic object volume larger than the holographic object volume of either of the individual displays may be achieved. Similarly, if a real-world surface 123A is used in place of a holographic surface 123A, the relative positioning of relayed holographic objects 121C and 122C with the holographic image 123C from the real-world object 123A may be adjusted and customized to any application. Note that this discussion about variable separation between screen planes 1022B and 1022C can also be applied to the case when only one relay is used, such as 130.

FIG. 3C shows the same configuration shown in FIG. 3B, but the light that reflects from the second transmissive reflector 301B of the second relay system 140 along the set of reflected paths 141B, 142B, and 143B are shown being received by a second observer 1051. The numbering in FIG. 3B applies to FIG. 3C. Light along the first set of relayed light paths 131B and 132B from depth-reversed relayed holographic objects 121B and 122B are reflected into reflected light paths 141B and 142B, respectively, and may, in an embodiment, pass through a corrective optical element placed at plane 137. The corrective optical element may be similar to that shown in FIG. 2A, acting to reverse the polarity of the angular light field coordinates u and v, resulting in the second observer 1051 perceiving the relayed holographic surfaces 121C and 122C with the same depth profile relative to plane 137 as the depth profile of the source projected surfaces 121A and 122A relative to display plane 1021 of light field display 1001A, respectively. In a similar way, the object 123A, which may be a holographic surface projected by display 1001B, or a the surface of a real-world object, produces rays of light which are relayed by relay system 130 along relayed light paths 133B which form depth-reversed image 123B, and are reflected by the surface 430 of transmissive reflector 301B into light along the reflected paths 143B. The optional corrective optical element placed at 137 just described may also reverse the depth so that second observer 1051 may see relayed image 123C with the same depth profile as the depth profile of surface 123A. In this way observers 1050 and 1051 will see the same holographic images in the same locations.

As previously described, if first observer 1050 sees depth-correct relayed holographic images 121C, 122C, and 123C, then the corresponding light along paths 141B, 142B, and 143B approaching plane 137 on its way to second observer 1051 will be of depth-reversed images 121B, 122B, and 123B. Instead of placing corrective optics at plane 137, it is possible to instead use a third relay system (not shown) to reverse the depths of these depth-reversed images 121B, 122B, and 123B. One drawback to this method is the fact that with an additional relay (not shown) now the second observer 1051 (located in a different position to receive light from the additional relay, not shown) of the relayed images will not see these relayed images at the same locations as holographic images 121C, 122C, and 123C perceived by the first observer 1050.

Figure 4C:
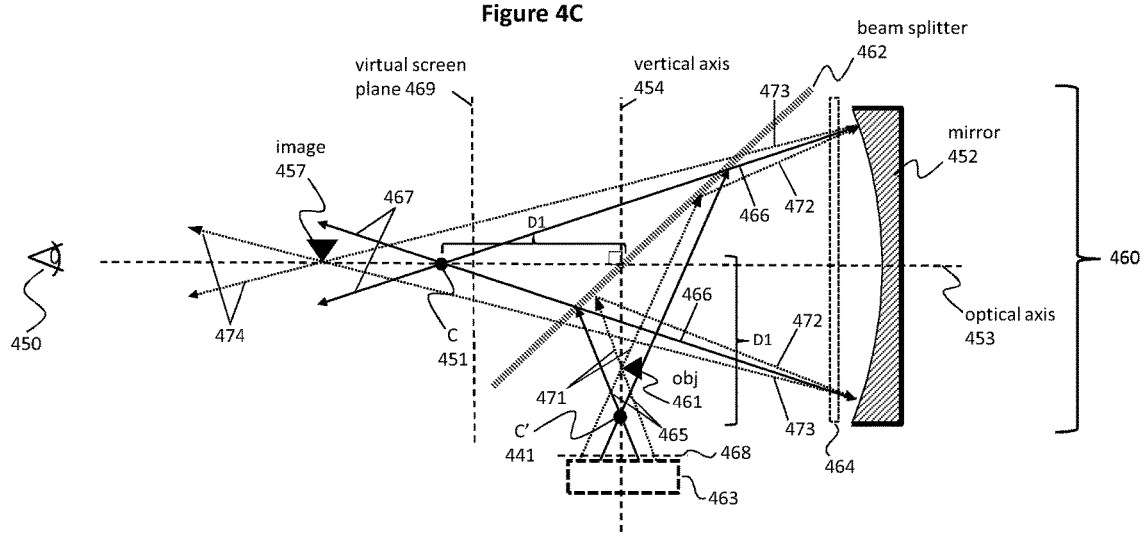
FIG. 4C illustrates an embodiment of a holographic display system having a relay system comprising a concave mirror.

It is possible to use other focusing optical elements, defocusing optical elements, mirrored surfaces, or any combination of these to relay a holographic object volume around a light field display plane. FIG. 4C shows an embodiment which uses a curved mirror as a focusing element in place of a retroreflector to relay a holographic object volume without depth reversal. FIG. 4C shows an orthographic view of a triangular surface being imaged using a holographic relay system 460 comprised of both a beam splitter 462 and a concave mirror 452, where the surface is on the optical axis 453. In an embodiment, the concave mirror 452 may be spherical, parabolic, or some other shape. The beam splitter 462 may be any beam splitter described herein. The triangular surface 461 is placed on a vertical axis 454 which is orthogonal to the horizontal optical axis 453. The center of the curvature of the mirror C, at 451, is distance D1 away from the beam splitter. The point C' 441 is also the same distance D1 away from the beam splitter, on the vertical optical axis 454. A portion of light leaving the point C' 441 along a set of projected light paths 465 will reflect from the beam splitter 462 into light rays along a set of reflected light paths 466 incident on the mirror 452. The concave mirror 452 and the beam splitter 462 are aligned such that a portion of light 466 reflected from the beam splitter 462 towards the concave mirror 452 is reflected and focused from the concave mirror 452 back through the beam splitter 462 along a set of relayed light paths 467 that extend along a return direction substantially opposite to the set of reflected light paths 466. Light along the relayed paths 467 may be relayed through point C 451 towards the virtual screen plane 469. Surface 461 could be a real surface, or a holographic surface projected by a LF display 463. Similarly, light rays along projected paths 471 from surface 461 will reflect from the beam splitter 462 into reflected light paths 472, which reflect from the concave mirror 452, and some of the return light 473 will pass through the beam splitter 462 and along relayed light paths 474 which converge to contribute to forming an relayed image 457 of the surface 461 viewed by observer 450. The optional optical layer 464 may contain polarization-controlling optics, lens elements, diffractive optics, refractive optics, or the like. In one embodiment, as described above for FIG. 3A, optical layer 464 is a quarter wave retarder which may convert linearly polarized light into circularly polarized light, and vice-versa. If a polarization beam splitter 462 is used, the light leaving the beam splitter 462 on the reflected light paths 472 is linearly polarized in a first state. Rays along the reflected light paths 472 may be converted from the first state of linear polarization to a circular polarization which is converted to the opposite circular polarization upon reflection by the mirror 452, and further converted to a second state of linear polarization orthogonal to the first state by the quarter wave retarder 464. The result is that rays 473 approaching the polarization beam splitter 462 will have the opposite linear polarization as compared to rays along the reflected light path 472 leaving the polarization beam splitter 462, and these rays will pass through the beam splitter 462, contributing to the imaging of the relayed image 457 viewed by viewer 450, rather than being deflected. In the configuration shown in FIG. 4C, holographic surfaces projected by the LF display 463 around the display screen plane 468, which may be the same as the display surface of the LF display 463, are relayed to be around the virtual screen plane 469, viewable by an observer 450.

In an embodiment, surfaces in the vicinity of point C' 441 are relayed into the vicinity of point C 451. Another feature of this optical system is that objects that are closer to the beam splitter 462 than point C' 441 are imaged to a position further than the point C 451 from the beam splitter, with magnification, and objects that are further from the beam splitter 462 than point C' 441 are imaged to a position closer than the point C 451 from the beam splitter, with minification. This means that the depth ordering for holographic objects produced in the vicinity of point C' 441 is respected when they are relayed to point C 451. The magnification or minification of objects in the vicinity of point C' 441 may be reduced by increasing the radius of curvature of mirror 452 and/or making the depth range of the projected holographic objects small about point C' 441 relative to the radius of curvature of the mirror 452. While the example illustrated in FIG. 4B shows a spherical mirror, it is possible to use different configurations of mirrors to perform imaging, including parabolic-shaped concave mirrors, and even convex mirrors which may be spherical or parabolic for projection of images with convergence points behind the mirror (to the right of the mirror 452 in FIG. 4C), on the other side of the mirror from the viewer 450.

In some embodiments, the focusing function of the mirror 452 shown in FIG. 4C may be replaced with one or more optical elements such as lenses, mirrors, or some combination of these elements. In one embodiment, shown in FIG. 4E, the relay system 460 may be replaced by a relay system 470 comprised of a beam splitter, one or more lenses including lens 444 and optional lens 445, and a reflector 442 on the opposite side of the one or more lens from the beam splitter 462. The reflector may be orthogonal to the optical axis 453. The optical axes of the one or more lenses may be substantially aligned with optical axis 453. In this case, the light rays from holographic object 461 reflecting from the beam splitter 462 and toward the reflector 442 would each pass through the one or more lens, and the one or more lens would provide a focusing function. In one embodiment, a planar reflector is used, and the focal plane of at least one lens 444 or lens 445 is located at the focal point of the planar reflector 442. In a different embodiment, the reflector 442 is curved. In another embodiment, the one or more lenses 444, 445 are replaced with arrays of much smaller lenses.

In another embodiment, the entire relay system 460 may be replaced with a relay formed of one or more lenses. FIG. 4F shows an embodiment in which lens relay system 480, comprised of one or more lenses which relay holographic surface 437 around the screen plane 468 of light field display 463 to relayed holographic surface 438, replaces relay system 460. The one or more lenses including lens 446 and optional lens 447 may have a common optical axis that may be substantially aligned with a normal to the display surface 468, along optical axis 454. The one or more lenses may perform a focusing function which optically relays the region around the display screen plane 468 to a virtual screen plane 435 near the optical axis but on the far side of the one or more lenses from the light field display 463. Optical systems with lenses may also contain focus points, and magnification or minification of holographic objects projected by the light field display 463 in the vicinity of the display screen plane 468, much the same as described above for the configuration shown in FIG. 4D.

Figure 4D:
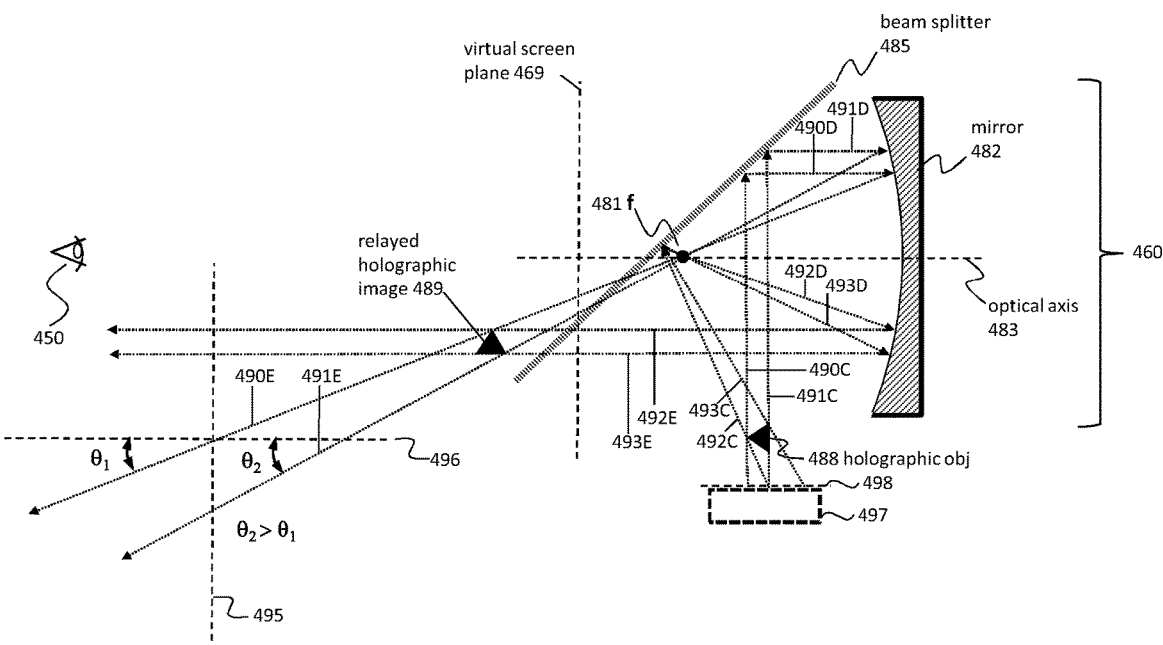
FIG. 4D illustrates another embodiment of a holographic display system having a relay system comprising a concave mirror.
Figure 4E:
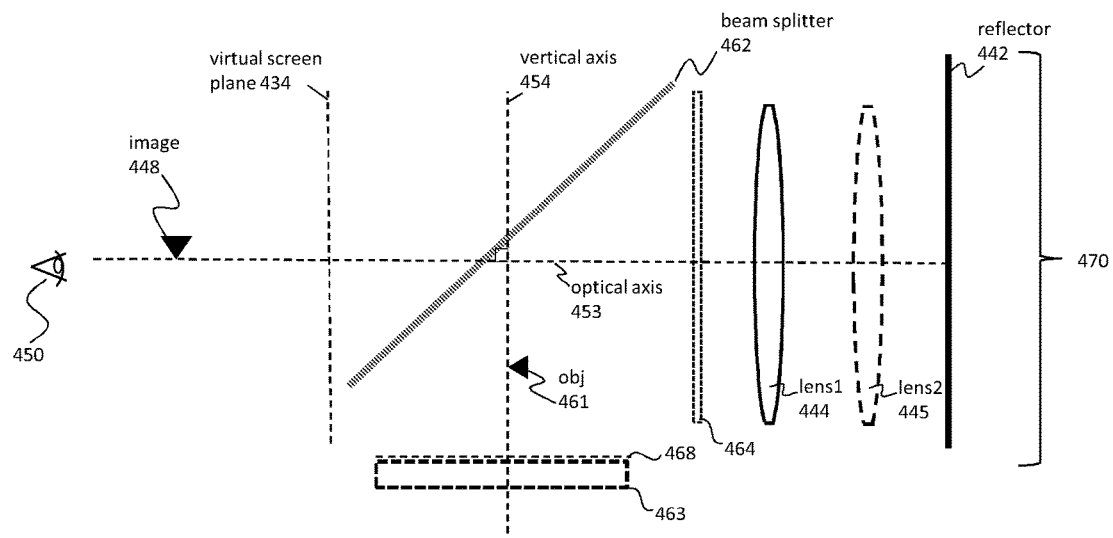
FIG. 4E illustrates another embodiment of a holographic display system having a relay system comprising a beam splitter, at least one lens, and a reflector.
Figure 4F:
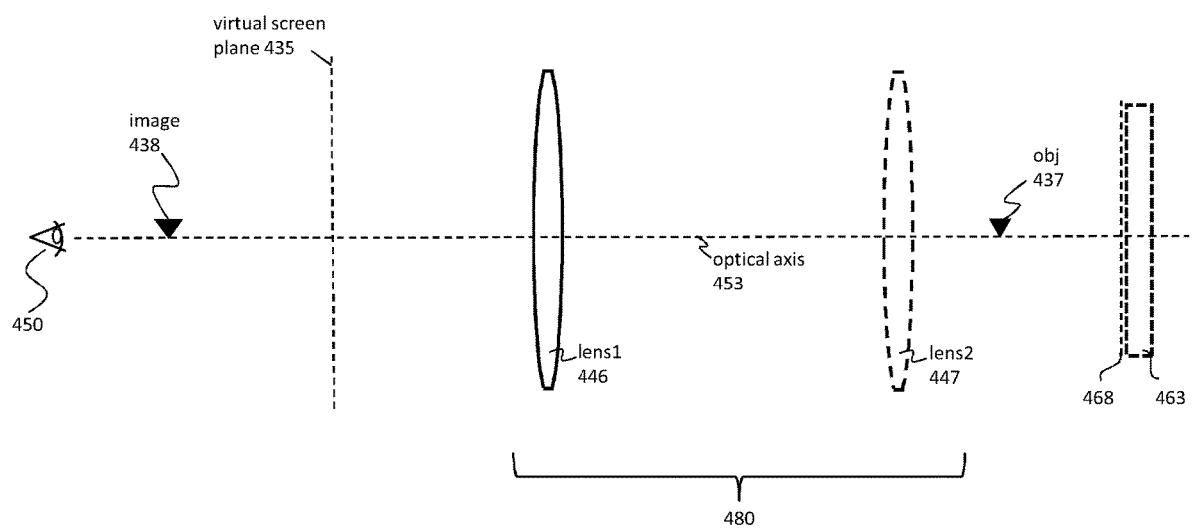
FIG. 4F illustrates another embodiment of a holographic display system having a relay system comprising a lens system.

FIG. 4D is an orthogonal view of a holographic surface 488 being relayed to holographic surface 489 using a holographic relay system comprised of a curved concave mirror 482 and a beam splitter 485, where the holographic surface is offset from the optical axis 483. The point 481 is a focal point of the mirror which may be spherical, parabolic, or some other shape. As drawn, the surface 488 is a holographic surface projected from a light field display 497, but the imaging described here also works if the surface 488 is a real surface. Light paths 490C and 492C are projected at different angles from the light field display 497, and converge to form another vertex of the surface 488. These light along projected paths 490C and 492C reflect from the beam splitter 485 (with some loss due to passing directly through the beam splitter, which is not shown) to become light rays along reflected light paths 490D and 492D, which then reflect off the surface of the mirror 482 to become light rays on relayed paths 490E and 492E, which pass through the beam splitter (with some loss, which is not shown) and converge again at one vertex of the image 489, helping form the image 489. Light rays along paths 491C and 493C are projected at different angles from the light field display 497, and converge to form one vertex of the surface 488. These light rays along 491C and 493C reflect from the beam splitter 485 (with some loss due to passing directly through the beam splitter, which is not shown) to become light rays along reflected paths 491D and 493D, which then reflect from the surface of the mirror 482 to become light rays on relayed paths 491E and 493E, which pass through the beam splitter (with some loss, not shown) and converge again at one vertex of the image 489, helping form the image 489. Light rays along projected paths 492C and 493C reflect as light rays along reflected paths 492D and 493D from the beam splitter, and pass through the focal point 481 of the curved mirror 482, turning into rays along relayed paths 492E and 493E which are parallel to the optical axis. Light rays along projected paths 490C and 491C reflect from the beam splitter as light rays along reflected 490D and 491D, respectively, and are parallel to the optical axis before reflecting from the curved mirror 482, so their reflected rays along relayed paths 490E and 491E, respectively, pass through the focal point 481 of the curved mirror 482. In the configuration shown in FIG. 4D, holographic surfaces projected by the LF display 497 around the screen plane 498, which may be the same as the display surface of the LF display 497, are relayed to be projected around the virtual screen plane 469, viewable by an observer 450.

In an embodiment, light rays along projected paths 490C and 491C in FIG. 4D are projected at a normal to the surface of the light field display 497, at a single angle, or equivalently, a single value of light field angular coordinate, which we assign to be u=0 (u is in the plane of the drawing—the orthogonal angular light field coordinate v is not discussed in reference to FIG. 4D, but similar comments apply to v as well). These rays are reflected by the beam splitter 485 into rays along reflected paths 490D and 491D, which then reflect from the mirror into rays along the relayed paths 490E and 491E. These two light rays, visible to the observer 450, make different angles $\theta_1$ and $\theta_2$ with a normal 496 to a line 495 parallel with the virtual screen plane 496, and thus contribute two different values of light field angular coordinate u to the imaging of the relayed holographic surface 489. In other words, despite both rays having a single value of light field angular coordinate u=0 as projected by the light field display 497, they have different values of u at the relayed holographic surface 489, and this u value (or equivalently angle) is dependent in part on the position of the object relative to the focal point 481 of the mirror. Also, the two rays along projected paths 492C and 493C, projected at light field angular coordinates (u1 and a u2) from the light field display 497, reflect from the beam splitter and the mirror system to become light rays along relayed paths 492E and 493E, both parallel to each other and parallel to a normal 496 to the virtual screen plane 469, so that they have the same light field coordinate u=0 at this virtual screen plane 469, as viewed by the observer. In other words, the angular light field coordinates of the holographic surface 488 are rearranged by the holographic relay system 460 comprised of the beam splitter 485 and curved mirror 482 in forming the relayed holographic surface 489. To correct for this, the angular light field coordinates leaving the screen plane 498 of light field display 497 may be arranged in a compensated manner to achieve the desired angular light field coordinates leaving the relayed virtual screen plane 469. Another perhaps unwanted effect is that the normal to the light field display surface 498, usually the light field angular coordinate u=0, often defines an axis of symmetry for projected rays from the light field display surface 498. The light rays produced at u=0 from the light field display 497, defining axes of symmetry from the light field display surface 498, may be relayed to the virtual screen plane 469 with significant values of u (i.e. angle θ with the normal 496 to the virtual screen plane 469 may vary), especially if the relayed holographic image is offset significantly from the optical axis 483. This may cause the field of view to be altered. In general, to minimize field-of-view changes for holographic surfaces relayed by optical relay system shown in FIG. 4D, the light field display 497 may be centered so that holographic surfaces such as 488 may relayed to positions 489 which are as close as possible to the optical axis 483. In some embodiments, the focusing function of the mirror 482 shown in FIG. 4D may be replaced with one or more optical elements such as lenses, mirrors, or some combination of these elements. In one embodiment, the mirror 482 may be replaced by the lens 444 and reflector 442 shown in FIG. 4E as discussed above with respect to FIG. 4C. In another embodiment, the entire relay system 460 may be replaced with a relay formed of one or more lenses such as the lens relay system 480 shown in FIG. 4F as discussed above with respect to FIG. 4C.

Figure 5A:
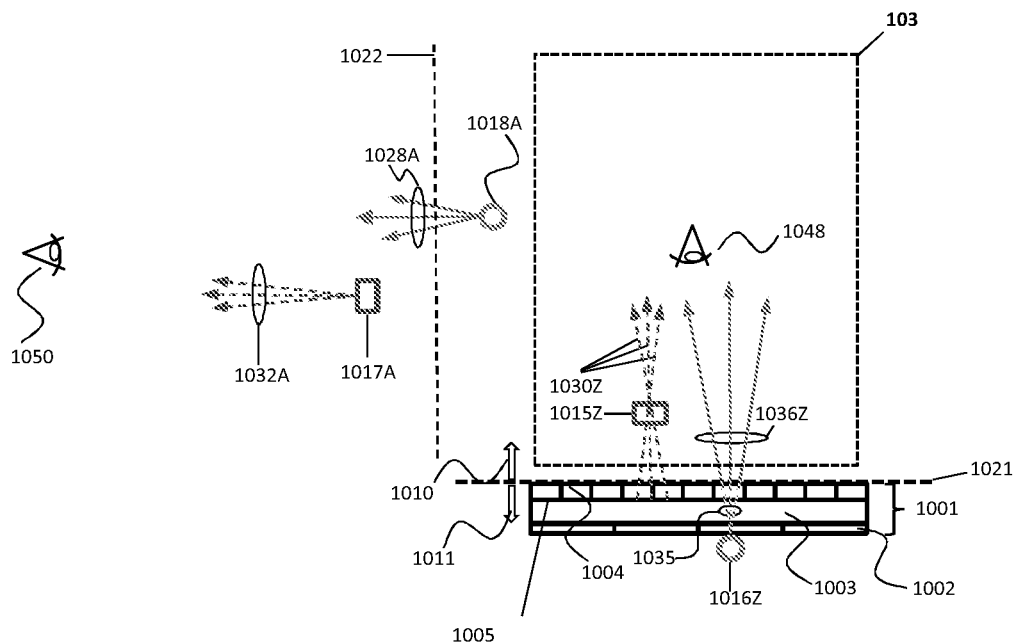
FIG. 5A illustrates an embodiment of an ideal relay system.

FIG. 5A shows an orthogonal view of a light field display and an ideal holographic object relay system 103 which relays two holographic objects projected on either side of a light field display screen plane 1021 at a first location and viewed to a first observer 1048, to two relayed holographic surfaces on either side of a virtual display screen 1022 at a second location and viewed by a second observer 1050. The light field display 1001 may output light along a set of projected light paths that includes light rays along projected light paths 1030Z that help form surface 1015Z in front 1010 of light field display screen plane 1021, and light rays along projected light paths 1036Z that help form object 1016A behind 1011 the screen plane 1021. Light paths 1035 are traced paths for the light rays 1036Z that originate at the light field display surface 1021, which in this example is collocated with the display screen plane. Under ideal circumstances, the relayed holographic objects 1017A and 1017B on either side of virtual screen plane 1022 appear to observer 1050 exactly as directly projected holographic objects 1015Z and 1016Z appear to observer 1048 in absence of any relay system 103. In other words, the LF display 1001 and the relay system 103 should be configured so that light rays along relayed paths 1032A and 1028A which form relayed holographic surfaces 1017A and 1018A, respectively, reach observer 1050 in the same way that the corresponding light rays along projected paths 1030Z and 1036Z which form the directly projected holographic surfaces 1015Z and 1016Z, respectively, reach observer 1048 in the absence of any relay system 103. From FIGS. 1A, 1B and 3A, and the discussion below, it will be clear that to generate the relayed holographic objects 1032A and 1028A using a practical implementation of a relay system 103, the location, depth profile, and magnification of projected objects 1015Z and 1016Z may have to be adjusted from their locations shown in FIG. 5A, and the light field angular coordinates may have to be rearranged for each of these projected holographic source objects 1015Z and 1016Z.

Figure 5B:
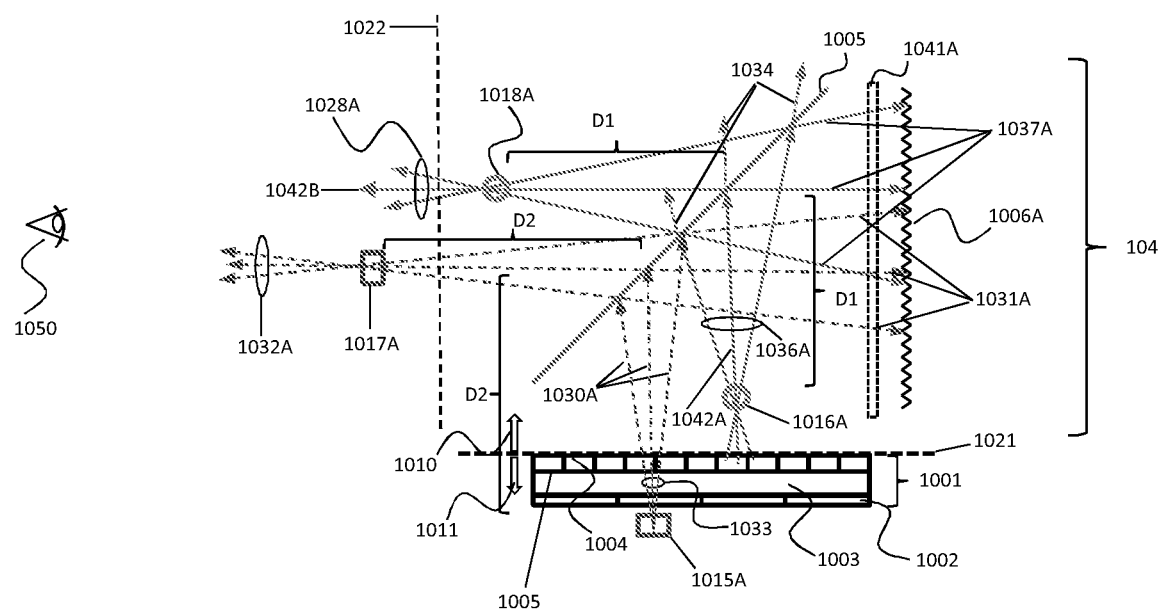
FIG. 5B illustrates an embodiment of holographic display system having a relay system configured to relay first and second holographic surfaces projected by a light field display using a beam splitter and an image retroreflector.

FIG. 5B shows an embodiment of a holographic display system similar to the holographic display system of FIG. 1A. The holographic display system of FIG. 5B includes a first display 1001, which may be a light field display configured to project light along a set of projected light paths 1030A and 1036A to form at least first and second holographic surfaces 1015A and 1016A having first and second depth profiles relative to a display screen plane 1021, respectively. The holographic display system also includes a relay system 104 positioned to receive light along the set of projected light paths 1030A and 1036A from the light field display 1001 and relay the received light along a set of relayed light paths 1032A and 1028A such that points on the first and second projected holographic surfaces 1015A and 1016A are relayed to relayed locations that form first and second relayed holographic surfaces 1017A and 1018A, having first and second relayed depth profiles relative to a virtual screen plane 1022, respectively.

Figure 5C:
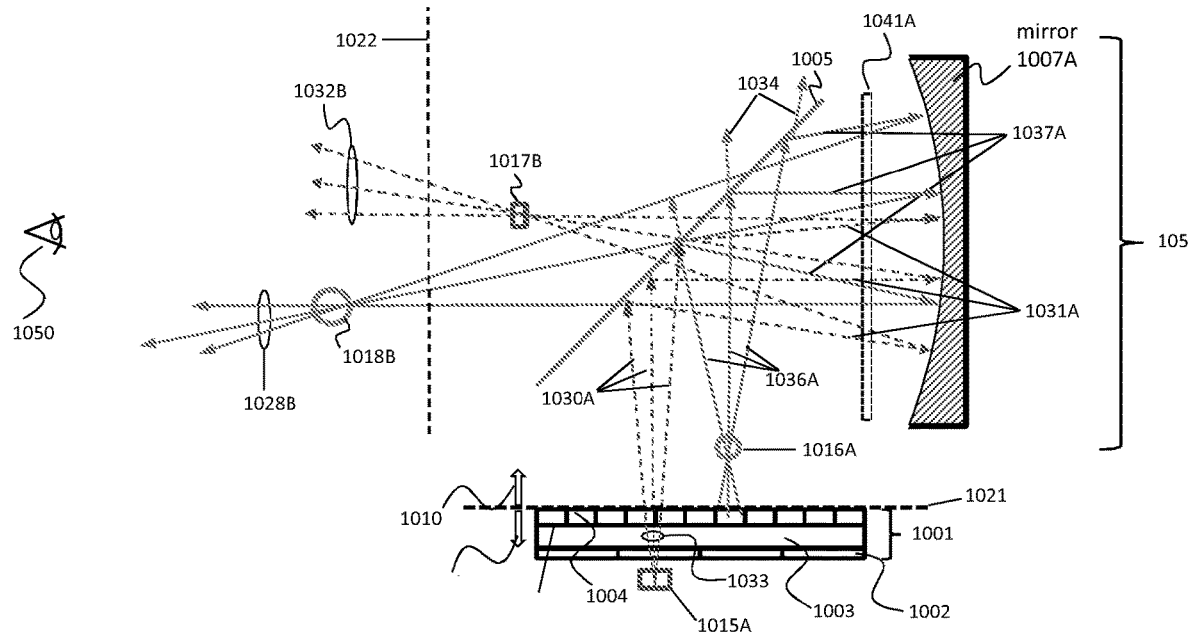
FIG. 5C illustrates an embodiment of a holographic display system having a relay system configured to relay first and second holographic surfaces projected by a light field display using a beam splitter and a concave mirror.

FIG. 5B shows a holographic relay system 104 comprised of a beam splitter 1005 and an image retroreflector 1006A. The light field display 1001 may be similar to the light field display 1001 discussed above respect to FIGS. 1A, 1B, 3A and 5A. The light field display 1001 projects out-of-screen holographic surface 1016A on the viewer side 1010 of the screen plane 1021, and in-screen holographic surface 1015A on the display side 1011 of the screen plane 1021. In an embodiment, the light field display 1001 may output light along a set of projected light paths that includes light rays along projected light paths 1036A that help form surface 1016A, and light rays along projected light paths 1030A that help form in-screen surface 1015A (paths 1033 are ray trace lines that don't represent physical rays). Each of the set of projected light paths 1030A and 1036A has a set of positional coordinates (X,Y) and angular coordinates (U,V) in a four-dimensional (4D) coordinate system defined by the light field display. These light rays may diverge as they approach the beam splitter 1005. Some fraction of this incident light is reflected by the beam splitter 1005 toward the image retroreflector 1006A along a set of reflected light paths that include paths 1037A from the incident light 1036A and paths 1031A from the incident light 1030A, while the remaining light 1034 not reflected by the beam splitter passes through the beam splitter along a set of transmitted light paths 1034 and may be lost, not contributing to imaging of relayed holographic surfaces 1017A and 1017B. The retroreflector 1006A may contain a fine array of individual reflectors, such as corner reflectors. The retroreflector 1006A acts to reverse each ray of incident light paths 1037A, 1031A in substantially the opposite direction from the approach direction, with no significant spatial offset. Light rays along reflected light paths 1037A reverse their direction upon reflecting from the beam splitter 1005, substantially retrace their approach angle to retroreflector 1006A, and some fraction of their intensities pass through the beam splitter 1005 along relayed light paths 1028A, converging at the location 1018A of a holographic surface. In this way, holographic surface 1016A projected directly by the light field display 1001 is relayed to form relayed holographic surface 1018A. Similarly, rays along light paths 1031A reverse their direction upon hitting the beam splitter 1005, retrace their approach paths to retroreflector 1006A, and some fraction of their intensities pass through the beam splitter along relayed light paths 1032A, converging and forming holographic surface 1017A. In this way, holographic surface 1015A projected directly by the light field display 1001 is relayed to form holographic surface 1017A. The relayed light paths 1028A and 1032A make up a set of relayed light paths that originated from the set of projected light paths from the display 1001 to the beam splitter 1005 and then through the set of reflected light paths from the beam splitter 1005 to the retroreflector 1006A. In an embodiment, each of the set of relayed light paths has a set of positional coordinates (X,Y) and angular coordinates (U,V) in a four-dimensional (4D) coordinate system as defined by the relay system 104. In-screen surface 1015A, which is projected at a greater depth than out-of-screen surface 1016A by the light field display 1001, is relayed as surface 1017A, which is now closer to the viewer 1050 than surface 1018A relayed from 1016A. In other words, the depth profile of holographic surfaces 1015A and 1016A projected by the light field display is reversed by the holographic relay system 104. The vertical distance between holographic surface 1016A and the beam splitter 1005 D1 is substantially the same as the horizontal distance between the corresponding relayed holographic surface 1018A and the beam splitter 1005. Similarly, the vertical distance D2 between holographic surface 1015A and the beam splitter 1005 is substantially the same as the horizontal distance D2 between the relayed surface 1017A and the beam splitter 1005. As discussed in regard to the optional optical element 1041A shown in FIG. 1B, the optical element 1041A is also an optional optical element. This 1041A may be a quarter wave retarder which may result in a majority of light rays along paths 1031A or 1037A returning to the beam splitter 1005 with a linear polarization opposite from that of the light rays leaving the beam splitter 1005, whereupon the majority of these light rays will be directed toward the viewer 1050, rather than deflected by the beam splitter 1005 and towards the display 1001. Also, the light ray along path 1042A of the projected light paths 1036A from holographic surface 1016A, is projected from the light field display normal to the display screen plane 1021, and usually is assigned to the angular light field coordinate value (u=, v)=(0, 0). This light ray produces light ray along relayed path 1042B, which helps form relayed holographic surface 1018A. For observer 1050, the light ray 1042B is projected normal to the virtual display plane 1022, and will be perceived as a ray with light field angular coordinate(u, v)=(0, 0) to observer 1050. To further generalize, the optical relay system 103 preserves the light ray at light field coordinate (u, v)=(0, 0) to stay at that value, even after being relayed, despite the required rearrangement of light field angular coordinates that is shown in FIG. 2B to reverse depth with the retroreflector configuration shown in FIG. 5B. Alternatively, a corrective optical element may be included in the holographic display system of FIG. 5B to reverse depth. In an embodiment, a corrective optical element 20 shown in FIG. 2A may be disposed in the set of relayed light paths 1028A and 1032A, and the corrective optical element 20 is configured to reverse the polarity of the angular coordinates (U,V) of each of the set of relayed light paths such that a viewer perceiving the first and second relayed holographic surfaces 1017A, 1018A through the corrective optical element 20 would perceive the a corrected depth order that is the same as the depth order of the first and second holographic surfaces 1015A, 1016A. In an embodiment, the corrective optical element 20 may be disposed in the virtual display plane. In another embodiment, a corrective optical element 20 may be disposed in the set of projected light paths 1030A, 1036A and optically preceding the relay system 104, and the corrective optical element 20 may be configured to reverse the polarity of the angular coordinates (U,V) of each of the set of projected light paths 1030A, 1036A such that the first and second holographic surfaces 1015A and 1016A have a pre-corrected depth order. In an embodiment, the corrective optical element 20 may be disposed in the display screen plane FIG. 5C shows a light field display 1001 and a relay system 105 similar to the relay system 460 discussed above with respect to FIGS. 4C and 4D. In an embodiment, the holographic object volume relay 105 is comprised of a beam splitter used to redirect diverging light from holographic surfaces onto a concave reflective mirror 1007A which refocuses this diverging light into relayed holographic surfaces. Retroreflector 1006A in FIG. 5B has been replaced with a concave reflective mirror 1007A in FIG. 5C. In the setup shown in FIG. 5C, in an embodiment, the mirror may be a spherical mirror with a radius of curvature approximately equal to the optical path length between the display screen plane 1021 and the surface of the mirror, akin to the mirror center of curvature C' 441 in FIG. 4D being located at or near the screen plane 468 in FIG. 4C. The same holographic surfaces 1015A and 1016A are projected by the light field display 1001 as shown in FIG. 5B along a set of projected light paths 1030A, 1036A. The set of projected light paths 1030A and 1036A may be considered as determined according to a first four-dimensional (4D) function defined by the light field display 1001, such that each projected light path has a set of positional coordinates (X,Y) and angular coordinates (U,V) in a first 4D coordinate system defined with respect to a display screen plane 1021. Light from holographic surface 1015A reflects from the beam splitter 1005 into light rays along reflected light paths 1031A, rather than being directed backwards along their same path as they were with the retroreflector 1006A in FIG. 5B, these rays are reflected along relayed paths 1032B to converge and form holographic surface 1017B. The relayed holographic surface 1017B is slightly smaller than the source holographic surface 1015A, due to minification performed by the concave mirror corresponding to the optical path length between holographic surface 1015A and the mirror. In an embodiment, the mirror 1007A is a spherical mirror, and the path length between the holographic surface 1015A and the mirror 1007A is slightly larger than the radius of curvature of the surface of mirror 1007A. Similarly, light from holographic surface 1016A reflects from the beam splitter 1005 into light rays along reflected paths 1037A, but rather than being directed backwards along their same path as they were with the retroreflector 1006A in FIG. 5B, these rays are reflected along relayed paths 1028B to converge and form holographic surface 1018B. The relayed holographic surface 1018B is slightly larger than the source holographic surface 1016A, due to magnification performed by the concave mirror corresponding to the optical path length between holographic surface 1015A and the mirror. In an embodiment, the mirror is a spherical mirror, and the path length between the holographic surface 1016A and the mirror 1007A is slightly smaller than the radius of curvature of the surface of mirror 1007A. In addition, the depth ordering of the holographic surfaces is conserved by the relay: the source surface 1016A is projected to be in front of the screen plane 1021, and its relayed surface 1018B is also projected in front of virtual screen plane 1022. The source surface 1015A is projected behind the screen plane 1021, and its relayed surface 1017B is also projected behind the virtual screen plane 1022, further from the viewer in each case. Thus, the depth reversal that occurs with the retroreflector in FIG. 5B has been avoided by using the mirror 1007A. Finally, because an image generated by the concave mirror 1007A is flipped, the relayed holographic sphere 1018B is projected to a position beneath the relayed holographic box 1017B, in opposite order to the position of these surfaces that appears in FIG. 5B. The set of relayed light paths 1028B, 1032B may be considered as having been determined according to a second 4D function defined by the relay system 105, such that each relayed light path has a set of positional coordinates (X,Y) and angular coordinates (U,V) in a second 4D coordinate system defined with respect to a virtual screen plane 1022. The magnification, minification, and position changes of the relayed surfaces 1018B and 1017B are all the effect of the application of the second 4D function in the second 4D coordinate system.

Figure 5D:
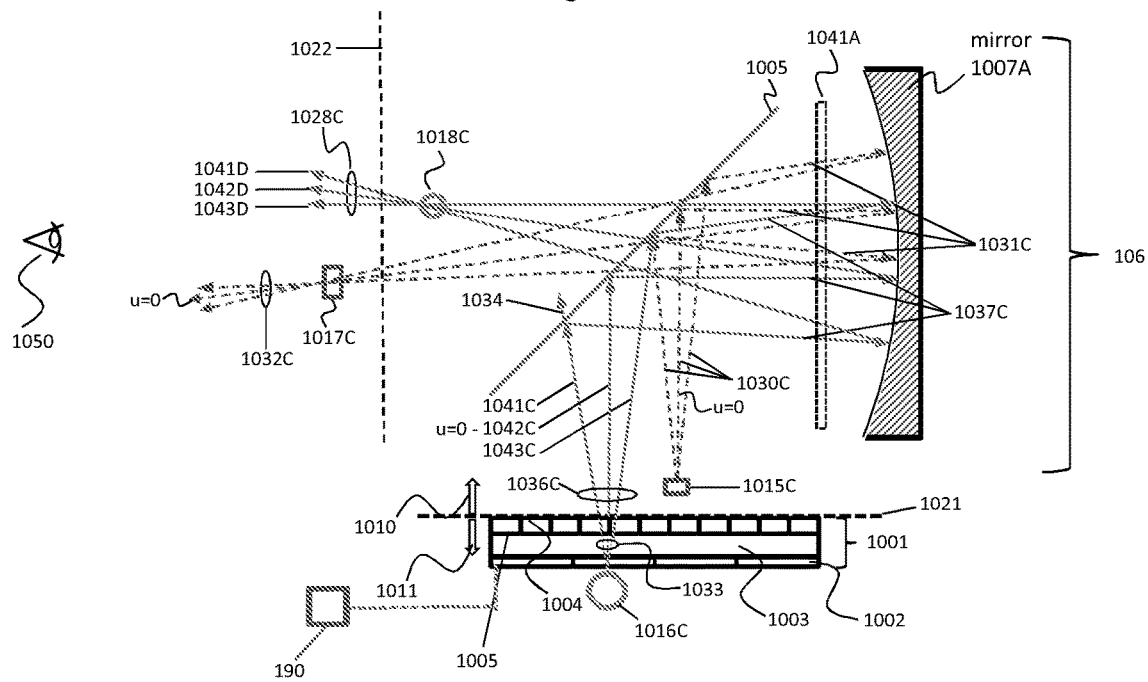
FIG. 5D illustrates an embodiment of correcting the optical effect of the relay system shown in FIG. 5C.

In order to generate the relayed holographic surfaces shown in FIG. 5B to a viewer 1050, some corrections may be made to the holographic surfaces projected by the display shown in FIG. 5C. In an embodiment, the light field display 1001 may include a controller 190 configured to receive instructions for accounting for the second 4D function by operating the light field display 1001 to output projected light according to the first 4D function such that the positional coordinates and angular coordinates in the second 4D coordinate system for each of the set of relayed light paths 1028C and 1017C allow the relayed holographic surfaces 1018C and 1017C to be presented to a viewer as intended. FIG. 5D shows the position and magnification of the holographic surfaces that would have to be generated by the light field display 1001 if a relay system 105 with a curved mirror configuration shown in FIG. 5D is used. Holographic surface 1015A in FIG. 5C would have to be projected to the position of holographic surface 1015C in FIG. 5D, and made slightly smaller to compensate for the magnification that results from the surface being a closer distance to the mirror. Holographic surface 1016A in FIG. 5C would have to be projected into the position of holographic surface 1016C in FIG. 5D, and magnified to compensate for the minification of the image that occurs at a greater distance from the mirror. The positions of holographic surfaces 1015C and 1016C are right-left swapped, relative to 1015A and 1016A in FIG. 5C to account for the inversion of the image that occurs with reflection due to the mirror. The result is that holographic surface 1015C is relayed into 1017C, in precisely the same place as 1017A in FIG. 5B, and holographic surface 1016C is relayed into 1018C, in precisely the same place as 1018A in FIG. 5B.

In FIG. 5D, the group of light rays along projected light paths 1036C which form the projected holographic sphere surface 1016C map to the group of light rays along relay light paths 1028C that form the relayed holographic surface 1018C. In a similar way, in FIG. 5B, the group of light rays along projected light paths 1036A from the holographic sphere surface 1016A map to the group of light rays along relayed light paths 1028A that form the relayed holographic surface 1018A. Upon close inspection of FIG. 5B, the middle ray 1042A projected normal to the screen plane 1021 (or display surface 1021) in FIG. 5B, often associated with a light field angular coordinate (u=, v)=(0, 0), maps to the middle ray 1042B which is normal to the virtual screen plane 1022 viewed by viewer 1050. In other words, for the retroreflector configuration shown in FIG. 5B, the light ray produced at (u=, v)=(0, 0) is preserved, despite the fact that the angular coordinates u and v have to be swapped as shown in FIG. 2B to correct the reversal of depth. However, in the curved mirror relay configuration shown in FIG. 5D, where no reversal of depth occurs, the center light ray 1042C in the group of projected light rays 1036C projected normal to the screen plane 1021 of light field display 1001, often associated with a light field angular coordinate (u=, v)=(0, 0), maps to the middle ray 1042D which may not be normal to the virtual screen plane 1022 viewed by viewer 1050. This is the same behavior that is shown in FIG. 4D, where light rays 490C and 491C projected normal to the display surface 497 produce light rays 490E and 491E, respectively, which generate angles $\theta_1$ and $\theta_2$ that vary with respect to the normal to the virtual screen plane 469, depending in part on the location the rays intersect the holographic surface 488. The result is that the viewer will not see the correct light field information from the light ray 1043D. In the example that a specular highlight is projected by the light field display 1001 in FIG. 5D along light ray along the projected light path 1042C, this specular highlight will appear on mapped ray along the relayed light path 1042D at an angle to the normal of virtual screen plane 1022. To correct for this, the color and intensity information that is projected on (u=, v)=(0, 0) ray along projected path 1042C in absence of relay system 106 should instead be projected on light ray along the projected path 1043C if the relay system 106 is in place so that this information will appear on mapped ray along the relayed path 1043D, which is the (u=, v)=(0, 0) ray relative to the virtual screen plane 1022 and the observer 1050. In other words, some remapping of light field coordinates may be made on the light field display 1001 (in addition to the magnification adjustments previously described) in order to properly relay a holographic surface using a relay optical configuration with a curved mirror 1007A.

Under the circumstance where the LF display 1001 produces unpolarized light, and an unpolarized 50% beam splitter 1005 is used, about half the light from holographic surfaces 1015C and 1016C is lost upon the first pass through the beam splitter 1005, and another half of the light is lost upon the second pass through the beam splitter 1005, resulting in no more than 25% of the light from the holographic surfaces being relayed. If a polarized beam splitter 1005 is used, then it is possible that half of unpolarized light from the holographic surfaces 1015C and 1016C is lost upon the first reflection from the beam splitter 1005, but the remaining light directed toward the mirror 1007A will be in a known first state of linear polarization. With a quarter wave retarder used for the optional optical element 1041A, the light returning from the mirror may be mostly in a known second state of linear polarization, orthogonal to the first state, and mostly be transmitted through the polarized beam splitter 1005, contributing to the relayed holographic surfaces 1017C and 1018C. Under these circumstances, between 25% and 50% of the light from the holographic surfaces 1015C and 1016C may be relayed to holographic surfaces 1017C and 1018C. If the light field display 1001 produces polarized light, this efficiency can be increased substantially with the use of a polarized beam splitter 1005 and a quarter wave retarder 1041A.

Figure 5E:
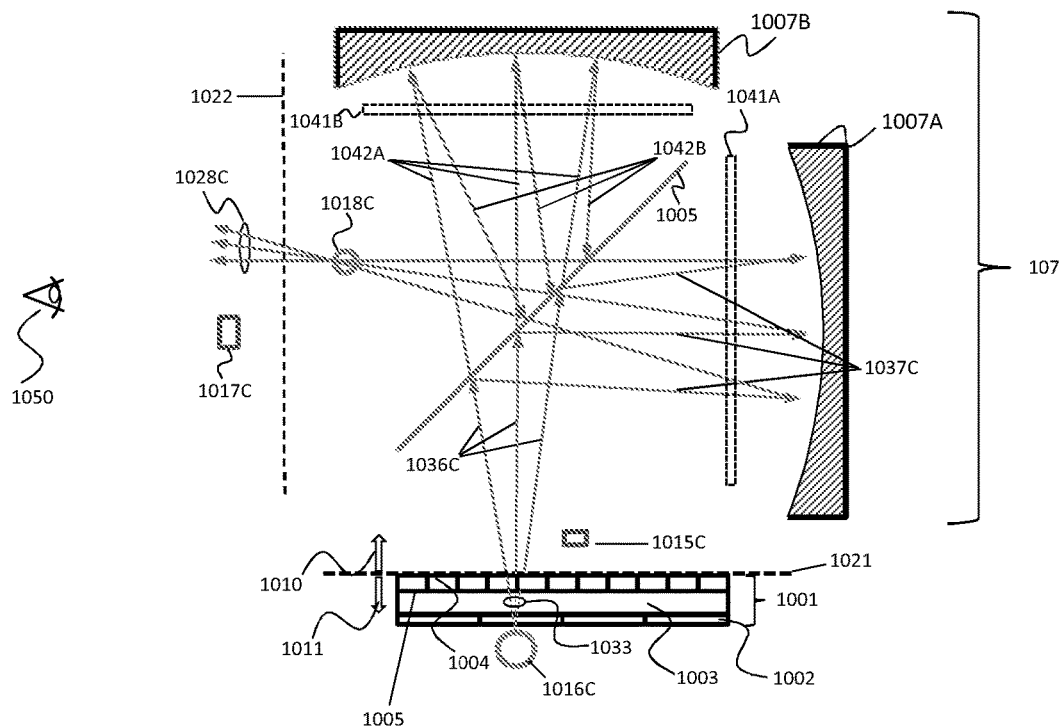
FIG. 5E illustrates an embodiment of a holographic display system having a relay system configured to relay first and second holographic surfaces projected by a light field display using a beam splitter and a plurality of concave mirrors.

In FIG. 5D, half of the light from light paths 1036C or 1030C from the holographic surfaces 1016C or 1015C, respectively, may be wasted since it passes through the beam splitter 1005 into light rays along transmitted paths 1034 as shown in FIG. 5C. It is possible to add another mirror 1007B, identical to mirror 1007A, placed opposite to the display 1001A on the other side of the beam splitter 1005, and orthogonal to mirror 1007A. FIG. 5E is an orthogonal view of a light field display and a holographic relay system 107 comprised of a beam splitter 1005 and two concave mirrors 1007A, 1007B placed orthogonally to one another to achieve a high efficiency for light transmission from projected holographic surfaces to relayed holographic surfaces. This configuration is similar in concept to the second retroreflector 1006B which appears in FIG. 1B. Light rays along the projected paths 1036C from holographic surface 1016C either is reflected by the beam splitter into reflected light paths 1037A directed toward the mirror 1007A, or passes through the beam splitter into transmitted light paths 1042A directed toward the mirror 1007B. Light paths 1037C directed toward mirror 1007A reflect into light paths which are again incident on the beam splitter 1005, and a fraction of this light is transmitted through to relayed paths 1028C (while the remaining fraction of this light incident on the beam splitter 1005, not shown, is directed downward back toward the light field display 1001). Light paths 1042A directed toward mirror 1007B reflect into light paths 1042B, which are incident on the beam splitter 1005, and a fraction of this light is reflected into paths 1028C, combining with the paths of light reflected by mirror 1007A (while the remaining fraction of this light, not shown, is transmitted through the beam splitter 1005 and directed back toward the light field display 1001). The same is true for light from holographic surface 1015C, being relayed into holographic surface 1017C, but these light paths are not shown in FIG. 5D. In an embodiment, the concave mirrors 1007A and 1007B and the beam splitter 1005 are aligned such that the light along paths 1028C reflected from mirrors 1007A and 1007B substantially overlap.

Under the circumstance where the LF display 1001 produces unpolarized light, and an unpolarized 50% beam splitter 1005 is used, almost all the light from holographic surfaces 1015C and 1016C is directed to either mirror 1007A or 1007B. Upon returning, at most half of the light reflected from each mirror may be transmitted through the beam splitter 1005 toward the display, and not contribute to imaging of relayed holographic surfaces 1016C or 1017C. This gives an upper limit of 50% of efficiency for light from holographic surfaces 1015C and 1016C to be relayed to holographic surfaces 1017C and 1018C. However, using a polarization beam splitter as well as a quarter wave retarder as the optional optical elements 1041A and 1041B, as described in the discussion of FIG. 1A as well as FIG. 5D, a substantially higher efficiency may result, since most of the light directed toward each mirror has a specific linear polarization which may be rotated by 90 degrees on its return trip back toward the beam splitter, resulting in most of the light of two different reflected polarizations being recombined as it is directed to the relayed holographic surfaces 1017C and 1018C.

In some embodiments, the focusing function of the mirrors 1007A and 1007B shown in FIGS. 5C-5E may be replaced with one or more optical elements such as lenses, mirrors, or some combination of these elements. In one embodiment, the mirrors 1007A and 1007B may each be replaced by the lens 444 and reflector 442 shown in FIG. 4E as discussed above with respect to FIG. 4C. In another embodiment, the entire relay systems 105 and 106 of FIGS. 5C-5D may be replaced with a relay formed of one or more lenses such as the lens relay system 480 shown in FIG. 4F as discussed above with respect to FIG. 4C.

The relay 106 of the configuration shown in FIG. 5D may be used as one or more of the relays in a holographic relay system comprised of two relays, as shown in FIG. 3B. In FIG. 3B, both of the relays 130 and 140 may be replaced with relay systems 106, but in FIG. 3C, only relay 130 may be replaced by relay 106, since relay 140 requires light to be transmitted in two different directions. In another embodiment, two substantially identical relays 106 are used in the holographic relay system configuration shown in FIG. 3B, and the effects of the minification, magnification, and rearranging of light field angular coordinates (u, v) for the first relay 130 described above in reference to FIG. 5D are at least partially reversed by the second relay 140.

Figure 6:
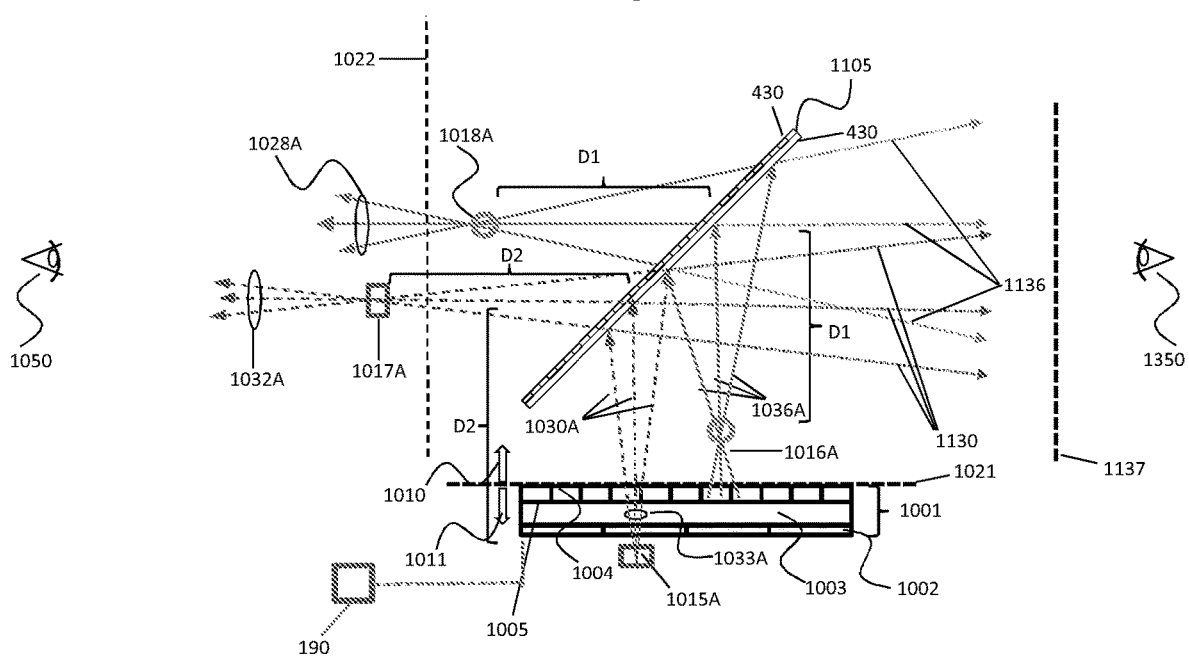
FIG. 6 illustrates an embodiment of a holographic display system having a relay system configured to relay first and second holographic surfaces projected by a light field display using a transmissive reflector.

FIG. 6 shows an embodiment of a system which relays holographic surfaces projected by a light field display 1001 using a transmissive reflector 1105. An example of element 1105 is a dihedral corner reflector array (DCRA), which is an optical imaging element composed of a plurality of dihedral corner reflectors, which can be realized as a two thin layers of closely-spaced parallel mirror planes, oriented so the planes are orthogonal to one another as shown in FIG. 4A. Another example is a corner reflector micro mirror array. The light field display 1001 may be similar to the light field display 1001 discussed above respect to FIG. 1. The light field display 1001 projects out-of-screen holographic surface 1016A on the viewer side 1010 of the screen plane 1021, and in-screen holographic surface 1015A on the display side 1011 of the screen plane 1021. The transmissive reflector 1105 is positioned to receive light along the set of projected light paths 1030A, 1036A and direct the received light along the set of relayed light paths 1032A, 1028A. In an embodiment, each of the set of projected light paths 1030A, 1036A has a set of positional coordinates (X,Y) and angular coordinates (U,V) in a four-dimensional (4D) coordinate system defined with respect to the display screen plane 1021. In an embodiment, the transmissive reflector 1105 internally reflects a portion of the received light among a plurality of internal reflective surfaces 401, 402 of the transmissive reflector 1105 and output light along the set of relayed light paths 1032A, 1028A towards a virtual screen plane 1022 in a first direction. In an embodiment, each light path in the set of relayed light paths 1032A, 1028A has a unique set of positional coordinates (X,Y) and angular coordinates (U,V) in a four-dimensional (4D) coordinate system defined with respect to the virtual screen plane 1022. Further, in an embodiment, an external surface 430 of the transmissive reflector 1105 reflects a second portion of the received light along a set of reflected light paths 1130, 1136 in a second direction opposite the first direction. In an embodiment, the set of reflected light paths 1130, 1136 and the set of relayed light paths 1032A, 1028A are substantially aligned such that the first and second relayed holographic surfaces 1015A, 1016A are perceived from the first and second directions to have the same depth profile relative to the virtual screen plane 1022.

In an embodiment, projected light rays along the project light paths 1036A that converge on the surface of holographic surface 1016, and projected light rays along the projected light paths 1030A that converge at in-screen holographic surface 1015A (see the ray trace lines 1033), all diverge as they approach the transmissive reflector 1105. Some fraction of incident light rays along the projected light paths 1036A reflect from the external surface 430 of 1105 into rays along reflected light paths 1136. The other portion of the incident light rays along the projected light paths 1036A pass through the transmissive reflector 1105, undergoing reflections, and exit as light rays along relayed light paths 1028, which converge to form the relayed holographic surface 1018A. Similarly, some fraction of incident light rays along the project light paths 1030A reflect from the external surface 430 of transmissive reflector 1105 into light rays along reflected light paths 1130, while the other portion of incident light rays along the project light paths 1030A are reflected within 1105 and emerge as converging light rays along relayed light paths 1032A, forming relayed holographic surface 1017A. Notice that projected surface 1015A, which was further from the viewer than projected surface 1016A, after being relayed as relayed surface 1017A is now closer to the viewer after the holographic scene has been relayed. The vertical distance between holographic surface 1016A and the beam splitter D1 is substantially the same as the horizontal distance between the relayed holographic surface 1018A and the beam splitter 1105. Similarly, the vertical distance D2 between holographic surface 1015A and the beam splitter 1105 is substantially the same as the horizontal distance between the relayed surface 1017A and the beam splitter 1105. An observer 1050 will see holographic surface 1017A floating in space slightly in front of holographic surface 1018A. An observer 1350 will see the reflected holographic surface 1018A perceived to be at the convergence point of set of reflected light paths 1136, and will see the reflected holographic surface 1015A perceived to be at the convergence point of set of reflected light paths 1130. However, if the holographic source surfaces 1015A and 1016A are rendered prior to being displayed in order to achieve the correct depth ordering of relayed holographic surfaces 1017A and 1018A as observed by viewer 1050, which means the depth of surfaces is reversed about the screen plane 1021 and the light field angular coordinates U-V are reversed as shown in FIGS. 2B and 2C, and discussed in reference to FIGS. 1A and 5B above, then the U-V coordinates will be reversed for the surfaces reflected from the surface of transmissive reflector 1105 and observed at 1350. In other words, the depth may not appear correctly for holographic surface 1017A or 1018A for an observer 1350 viewing light rays 1130 or 1136, respectively. To correct for this, it is possible to place a correction optical element similar to that shown in FIG. 2A at the plane 1137 in order to perform U-V coordinate reversal for the set of the reflected light paths 1130, 1136. In another embodiment, with a different light field rendering of holographic surfaces 1015A or 1016A, with no correction optical element at plane 1137, the observer 1350 may perceive the holographic surfaces 1017A and 1018A with the correct depth ordering, and a corrective optical element similar to that shown in FIG. 2A may be placed at the virtual display plane 1022 as discussed above with respect to FIG. 5B to allow observer 1050 to also view the holographic surfaces 1017A and 1018A with the correct depth ordering. In other words, if the correction optical element like that shown in FIG. 2A is used to allow both observers 1050 and 1350 to see the holographic surfaces 1017A and 1018A with the correct depth, they can be placed at plane 1022 or 1137, depending on whether the light field rendering of holographic surfaces from the light field display 1001 contains steps which reverse the depth around the screen plane 1021 and reverse the polarity of the U-V coordinates as shown in FIG. 2B.

Figure 7:
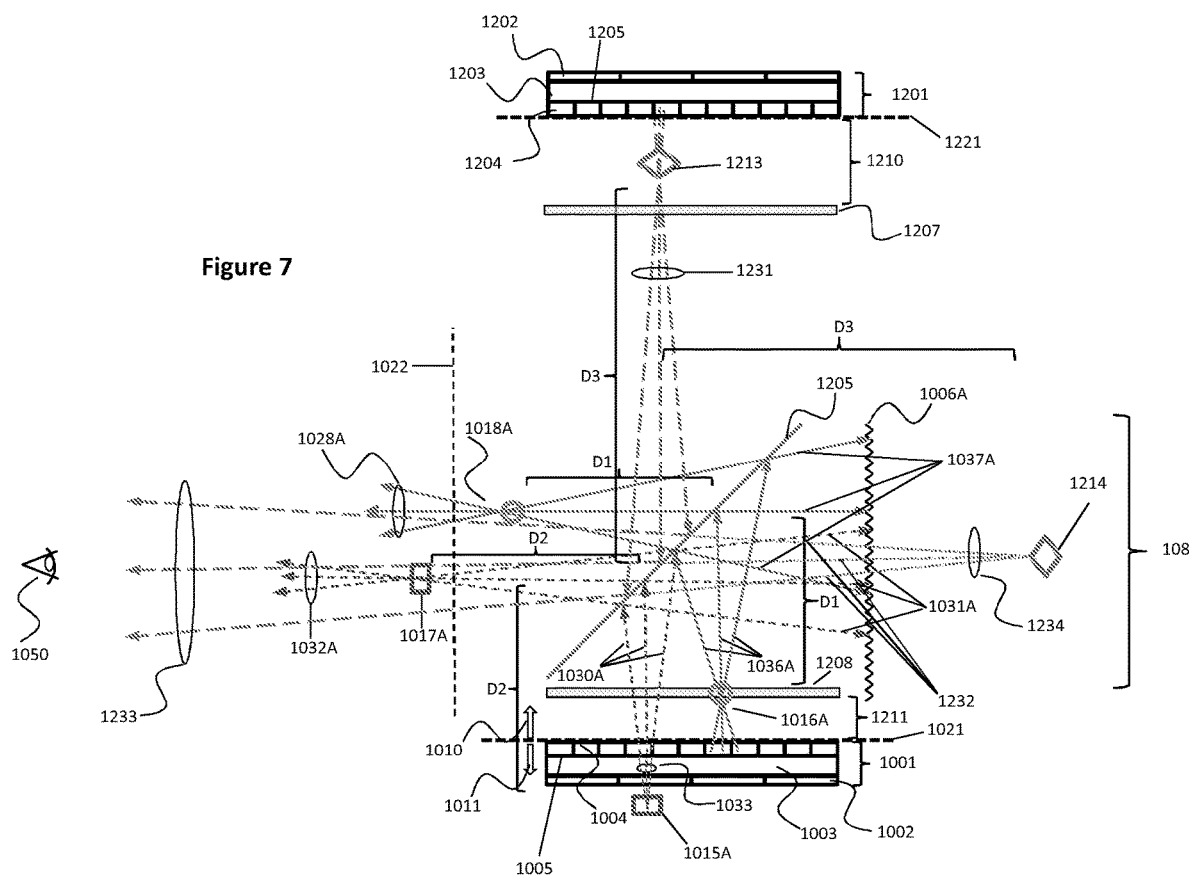
FIG. 7 illustrates an embodiment of a holographic display system having a first relay system configured to relay first and second holographic surfaces projected by a light field display and relay a third surface projected by a second display.

FIG. 7 illustrates a holographic system that is the same as the holographic system of FIG. 5B with the addition of another display 1201 opposite the first display 1001 and sandwiching the relay system 108, and the numerical labeling from FIG. 5B applies to FIG. 7. The relay system 108 is comprised of a beam splitter 1205 and a retroreflector 1006A. If 1201 is a light field display, then the light field display 1201 may be configured as the light field display 1001 discussed above with respect to FIG. 1A, with one or more display surfaces 1202, containing a plurality of light source locations, an imaging relay 1203 which may or may not be present which acts to relay images from the emissive displays to an energy surface 1205, and an array of waveguides 1204 which project each light source location on the energy surface into a particular direction in three dimensional space. The energy surface 1205 may be a seamless energy surface that has a combined resolution that is greater than any individual emissive display device 1202, while plane 1221 is the screen plane of 1201. If 1201 is a traditional 2D display, then relays 1203 and/or waveguides 1204 may be absent. Display 1201 may display a 2D image (not shown) or a holographic surface 1213. The rays along an additional set of projected light paths 1231 leaving the display 1201 reflect off of the surface of the beam splitter 1205, forming diverging ray group along an additional set of relayed light paths 1233, which can be ray traced back through imaginary paths 1234 to reveal a convergence point at a perceived holographic surface 1214. The vertical distance D3 between the displayed surface 1213 and the beam splitter 1205 is substantially equal to the horizontal distance between the beam splitter and the perceived surface 1214. An observer 1050 will see holographic surfaces 1017A, 1018A, and displayed surface 1214 which may or may not be holographic depending on whether display 1201 is a light field display. Using a 2D display as 1201, it is possible to create a uniform background imaging plane that can be placed at any reasonable distance from the observer 1050 depending on the distance between display 1201 and beam splitter 1205. A parallax element 1207 can be placed in the path of display 1201 at distance 1210 from the screen plane of 1201 in order to block some or all of the light from display 1201, and can take the form of a portion of a liquid crystal display without a backlight, a transparent display, a real physical surface, or the like. The parallax barrier 1207 can be used to block out portions of the surface 1214 in the event that holographic surface 1017A or holographic surface 1018A occludes 1214, and both images are not desired to be displayed at the same time. If the parallax barrier 1207 is a portion of an LCD panel containing one or more polarizers and a liquid crystal (LC) layer, the beam splitter can be a polarization beam splitter that is selected to reflect 100% of the polarized light passing through 1207. Similarly, a parallax barrier 1208 can be placed above light field display 1001 at a distance 1211 in order to block all or some of the light from display 1001, and can take the form of a portion of a liquid crystal display without a backlight, a transparent display, a real physical surface, etc. It is to be appreciated the various embodiments in above discussions with respect to FIG. 7 may be implemented in part or in whole in other embodiments of the holographic display systems of the present disclosure, including those in FIGS. 4C-4D and FIGS. 5C-5E. For example, the second display 1201 and parallax elements 1207 and 1208 discussed above may be implemented to work with a relay system that includes at least one concave mirror as described in FIGS. 4C-4D and FIGS. 5C-5E.

Figure 8A:
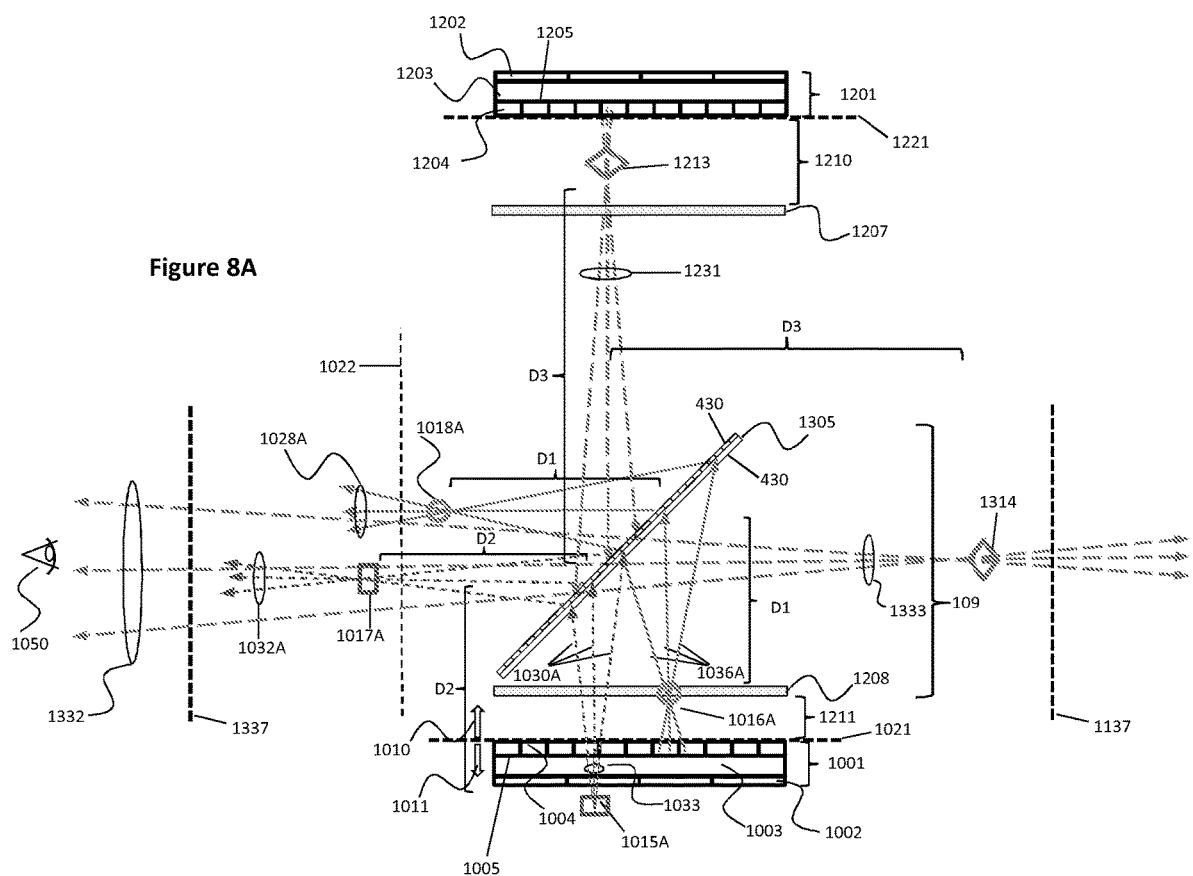
FIG. 8A illustrates an embodiment of a holographic display system having a second relay system, a plurality of displays.

Shown in FIG. 8A is a holographic system that is the same as the holographic system 110 of FIG. 6 with the addition of another display 1201 opposite the first display 1001 and sandwiching the relay system 109, and the numbering labelling from FIG. 6 applies to FIG. 8A. If display 1201 is a light field display, then the light field display 1201 may be configured as the light field display 1201 discussed above with respect to FIG. 7. Display 1201 may display a 2D image (not shown) or a holographic surface 1213. The rays along an additional set of projected light paths 1231 leaving the display may partially reflect off of the surface of the transmissive reflector 1305, forming diverging ray group along an additional set of relayed light paths 1332. Rays 1231 may also pass through the transmissive reflector 1305, undergoing reflections, and exit as light rays along a set of transmitted light paths 1333, which converge to form the relayed holographic surface 1314. The vertical distance D3 between the displayed surfaces 1213 and 1305 may be substantially equal to the horizontal distance between surface 1305 and the relayed holographic surface 1314. An observer 1050 will see holographic surfaces 1017A, 1018A, and displayed surface 1314 which may or may not be holographic depending on whether 1201 is a light field display. Using a 2D display as 1201, it is possible to create a uniform background imaging plane that can be placed at any reasonable distance from the observer 1050 depending on the distance between display 1201 and transmissive reflector 1305. A parallax element 1207 can be placed in the path of display 1201 at distance 1210 from the screen plane of 1201 in order to block some or all of the light from display 1201, and can take the form of a portion of a liquid crystal display without a backlight, a transparent display, a real physical surface, or the like. The parallax element 1207 can be used to block out portions of the surface 1314 in the event that holographic surface 1017A or holographic surface 1018A occludes 1214, and both images are not desired to be displayed at the same time. Similarly, a parallax element 1208 can be placed above light field display 1001 at a distance 1211 in order to block all or some of the light from display 1001, and can take the form of a portion of a liquid crystal display without a backlight, a transparent display, a real physical surface, etc. The parallax elements 1207 and 1208 may not be necessary to avoid occlusion problems if 1201 is a light field display, since coordinated rendering of both of the light field displays can be used to avoid occlusion. Normally, nothing will be placed on intermediate plane 1137 or the virtual screen plane 1337. However, corrective optical element 20 from FIG. 2A or similar configurations that reverse the polarity of the angular 4D light field coordinates U, V may be placed at plane 1137 and not plane 1337, or plane 1337 and not plane 1137, or at both locations, or at none. Also, corrective optics 20 at planes 1337 and 1137 may both be moved closer or further away from the transmissive reflector 1305. Another option is to have corrective optics 20 from FIG. 2A or similar configurations which reverse the polarity of U, V coordinates placed just above the screen plane 1021 of the light field display 1001. Finally, system 130 can be built using a mirror in place of transmissive reflector 1305, which may result in two independent views at observer 1050 on the left of 1305 and an observer located on the right of 1305 (not shown), where each observer would only be able to see holographic surfaces from a single display. It is to be appreciated the various embodiments in above discussions with respect to FIG. 8A may be implemented in part or in whole in other embodiments of the holographic display systems of the present disclosure, include those in FIGS. 4C-4D and FIGS. 5C-5E. For example, the additional display 1201 and parallax elements 1207 and 1208 discussed above may be implemented to work with a relay system that includes at least one concave mirror as described in FIGS. 4C-4D and FIGS. 5C-5E.

Figure 8B:
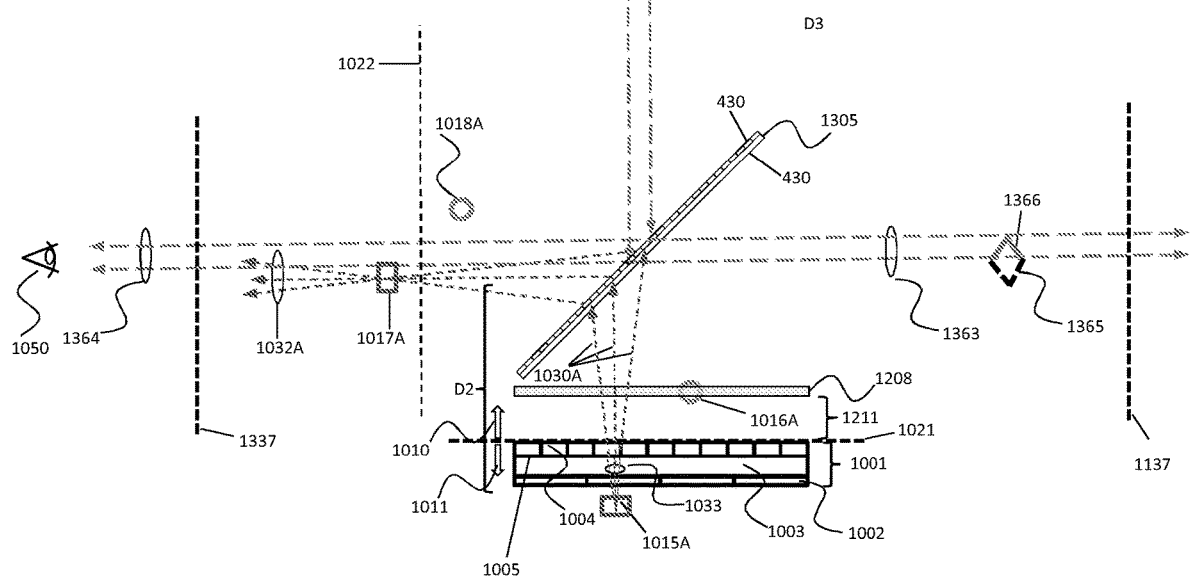
FIG. 8B illustrates an embodiment using the parallax barrier in FIG. 8A to perform occlusion handling.

FIG. 8B shows an embodiment using the parallax barrier in FIG. 8A to perform occlusion handling. The labels of FIG. 8A apply in this drawing. A portion 1367 of parallax barrier 1207 may be activated to block light 1361 from one side of projected surface 1213. Only the orthogonal rays 1362 from the surface 1213 are shown, and they partially reflect from the transmissive reflector 1305 into rays 1364 that reach the observer 1050. The rays 1362 are partially transmitted by 1305 and exit into rays 1363, which form the projected holographic surface 1366. Substantially no blocked light rays 1361 from the portion of the surface 1213 are visible to observer 1050, corresponding to the blocked portion 1365 of the relayed holographic image 1366.

Figure 8C:
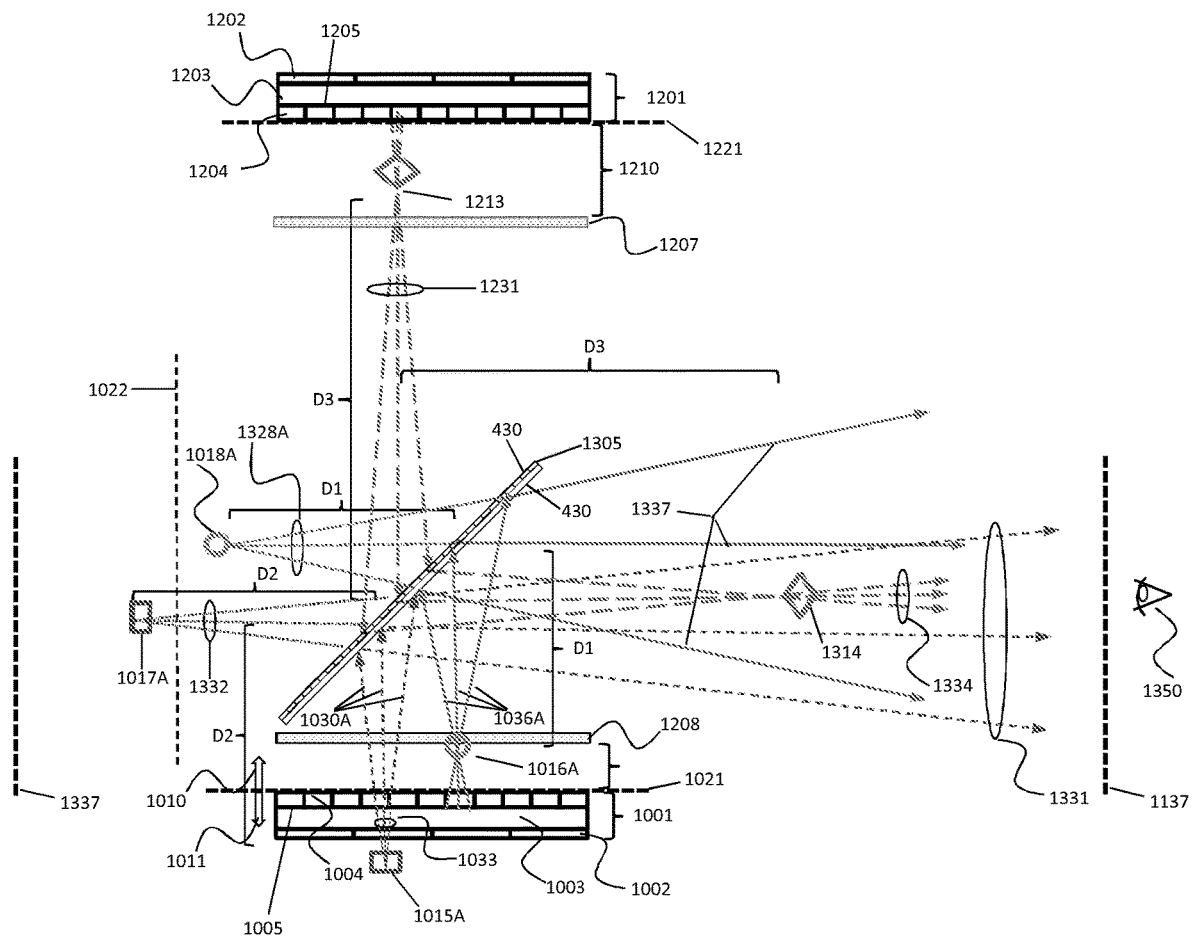
FIG. 8C illustrates an embodiment of a holographic display system similar to that shown in FIG. 8A perceived by a viewer at a different position.

FIG. 8C shows an embodiment of system similar to that shown in FIG. 8A, with substantially all the rays of light that would reach an observer 1350 on the right of transmissive reflector 1305, but omitting some of the light rays that would reach an observer on the left of 1305 (now shown). The labels of FIG. 8A apply to this drawing. Observer 1350 will perceive the holographic surface 1018A through the diverging rays 1337 reflected from 1305, and holographic surface 1017A through the diverging rays 1331 reflected from 1305. If the display 1201 is a holographic display, then holographic surface 1213 will be relayed to holographic surface 1314, and the observer 1350 will see 1314 in the foreground, and holographic surfaces 1017A and 1018A in the background. If the display 1201 is a 2D display, then observer 1350 will see a flat foreground image, and holographic surfaces 1017A and 1018A in the background. As discussed for FIG. 8A, if 1201 is a light field display, occlusion handling may be done by coordinating the two light fields 1001 and 1201, or by using the parallax barriers 1207 and/or 1208. If 1201 is a 2D display, then occlusion handling may be done using the parallax barriers 1207 and/or 1208.

FIG. 8D illustrates an embodiment showing an abstraction of the display system shown in FIGS. 8A and 8B. Display 1001 projects holographic surface 1016A which is relayed by transmissive reflector into surface 1018A which an observer 1050 sees in front of 1305. Display 1201 projects holographic surface 1213 which is relayed by 1305 into surface 1314 which an observer 1050 sees behind transmissive reflector 1305. An embodiment comprising partially or fully enclosed transmissive reflector surface 1305 may allow observers from all angles to see holographic surfaces in an extended viewing volume.

FIG. 8E is an embodiment of system of FIG. 8D with a transmissive reflector 1605 having at least a partially enclosed transmissive reflector surface. In an embodiment, the reflector surface may have a conical geometry configured to allow observers from all angles to see holographic surfaces in an extended viewing volume. Transmissive reflector 1605 may be a dihedral corner reflector array (DCRA), which is an optical imaging element composed of a plurality of dihedral corner reflectors, which can be realized as a two thin layers of closely-spaced parallel mirror planes, oriented so the planes are orthogonal to one another as shown in FIG. 4A. Another example is a corner reflector micro mirror array. Holographic surface 1213 is projected by light field display 1201, and is relayed by the transmissive cone-shaped reflector to viewable location 1314. Similarly, 1016A is projected by display 1001 and relayed to viewable surface 1018A. This configuration allows an arrangement of holographic surfaces to be projected and relayed to locations on the outside of the holographic cone as well as inside, a full 360 degrees around the display. Multiple observers like the one shown at 1050 are possible at multiple locations around the display. In an embodiment, the conical surface of the transmissive reflector 1605 may have an apex 1610 aligned with a center of the display 1001 or 1201. Occlusion handling can be done by coordinating the projection of surfaces from both displays 1201 and 1001, as discussed for FIGS. 8A and 8C. The transmissive reflector 1605 can be a cone shape, as shown, a regular pyramid with four or more planar sides, custom shaped, and may be fully or partially enclosed.

Figure 8F:
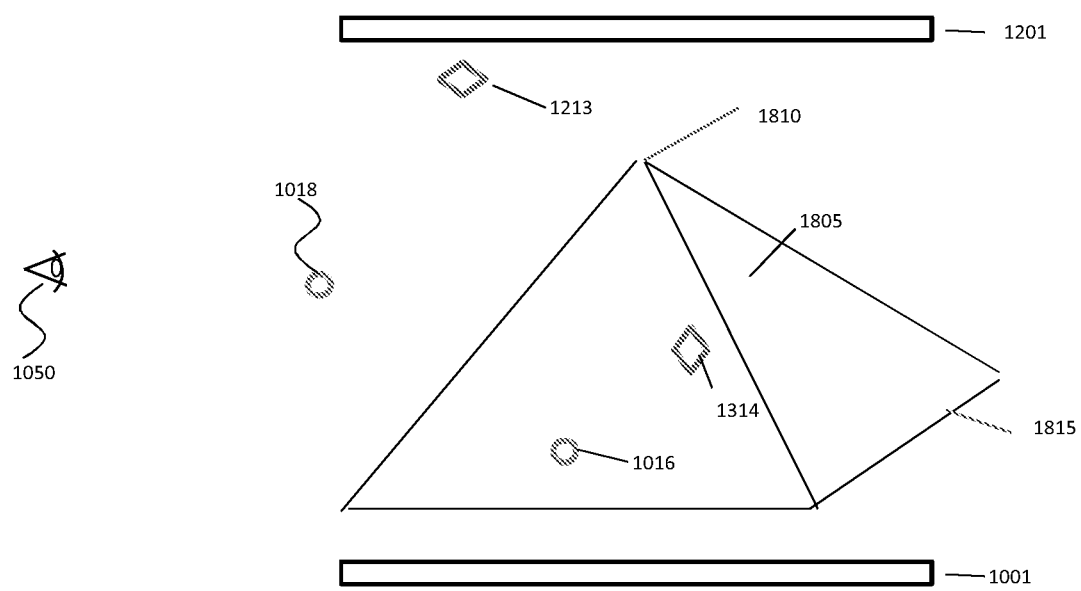
FIG. 8F illustrates an embodiment of system similar to that shown in FIG. 8E with a pyramid-shaped transmissive reflector surface.

In an embodiment, the transmissive reflector may be configured to have an apex 1810 and a polygonal base 1815. For, example, FIG. 8F illustrates an embodiment of system similar to that shown in FIG. 8E with a pyramid-shaped transmissive reflector surface 1805. In an embodiment, the apex 1810 of the transmissive reflector 1805 may be aligned with a center of the display 1001 or 1201.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention (s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a value herein that is modified by a word of approximation such as "about" or "substantially" may vary from the stated value by at least ±1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

The invention claimed is:

1. A holographic display system, comprising:
a first display, comprising a light field display configured to project light along a set of projected light paths to form at least a first holographic surface, the set of projected light paths determined according to a first four-dimensional (4D) function defined by the light field display, such that each projected light path has a set of positional coordinates and angular coordinates in a first 4D coordinate system defined with respect to a display screen plane; and
a relay system positioned to receive light along the set of projected light paths from the light field display and relay the received light along a set of relayed light paths such that points on the first holographic surface are relayed to relayed locations thereby forming a first relayed holographic surface, the set of relayed light paths having been determined according to a second 4D function defined by the relay system, such that each relayed light path has a set of positional coordinates and angular coordinates in a second 4D coordinate system defined with respect to a virtual screen plane;
wherein the light field display comprises a controller configured to receive instructions for accounting for the second 4D function by operating the light field display to output projected light according to the first 4D function such that the positional coordinates and angular coordinates in the second 4D coordinate system for each of the set of relayed light paths allow the relayed holographic surface to be presented to a viewer as intended;
wherein the relay system comprises a beam splitter and a concave mirror, the beam splitter positioned to receive light along the set of projected light paths and reflect a first portion of the received light towards the concave mirror along a set of reflected light paths;
wherein the concave mirror and the beam splitter are aligned such that light reflected from the beam splitter towards the concave mirror is reflected and focused from the concave mirror along the set of relayed light paths that extend along a return direction substantially opposite to the set of reflected light paths; and
wherein the set of projected light paths form a second holographic surface having a second projected depth profile relative to the display screen plane, and points on the second holographic surface are relayed by the relay system to relayed locations that form a second relayed holographic surface having a second relayed depth profile relative to the virtual screen plane.

2. The holographic display system of claim 1, wherein the light reflected from the concave mirror is directed through the beam splitter and towards the virtual screen plane.

3. The holographic display system of claim 1, wherein the relay system comprises an additional concave mirror and the beam splitter is configured to direct a second portion of the received light towards the additional concave mirror along a set of transmitted light paths.

4. The holographic display system of claim 3, wherein the additional concave mirror and the beam splitter are aligned such that projected light that was transmitted through the beam splitter towards the additional concave mirror is reflected from the additional concave mirror and further reflected by the beam splitter along an additional set of relayed light paths towards the virtual display screen, and further wherein the set of relay light paths and the additional set of relayed light paths substantially overlap.

5. The holographic display system of claim 1, wherein the second 4D function comprises at least one of magnification, minification, and position change of the first 4D function.

6. A holographic display system, comprising:
a first display, comprising a light field display configured to project light along a set of projected light paths to form at least a first holographic surface, the set of projected light paths determined according to a first four-dimensional (4D) function defined by the light field display, such that each projected light path has a set of positional coordinates and angular coordinates in a first 4D coordinate system defined with respect to a display screen plane; and
a relay system positioned to receive light along the set of projected light paths from the light field display and relay the received light along a set of relayed light paths such that points on the first holographic surface are relayed to relayed locations thereby forming a first relayed holographic surface, the set of relayed light paths having been determined according to a second 4D function defined by the relay system, such that each relayed light path has a set of positional coordinates and angular coordinates in a second 4D coordinate system defined with respect to a virtual screen plane;
wherein the light field display comprises a controller configured to receive instructions for accounting for the second 4D function by operating the light field display to output projected light according to the first 4D function such that the positional coordinates and angular coordinates in the second 4D coordinate system for each of the set of relayed light paths allow the relayed holographic surface to be presented to a viewer as intended;
wherein the relay system comprises a beam splitter and a concave mirror, the beam splitter positioned to receive light along the set of projected light paths and reflect a first portion of the received light towards the concave mirror along a set of reflected light paths;
wherein the concave mirror and the beam splitter are aligned such that light reflected from the beam splitter towards the concave mirror is reflected and focused from the concave mirror along the set of relayed light paths that extend along a return direction substantially opposite to the set of reflected light paths;
wherein the set of projected light paths form a second holographic surface having a second projected depth profile relative to the display screen plane, and points on the second holographic surface are relayed by the relay system to relayed locations that form a second relayed holographic surface having a second relayed depth profile relative to the virtual screen plane; and wherein the first 4D function exchanges intensity and color information between light paths that have the same positional coordinates in the first 4D coordinate system.

\* \* \* \* \*